United States Patent
Loveland et al.

(10) Patent No.: US 9,572,227 B2
(45) Date of Patent: Feb. 14, 2017

(54) INTELLIGENT LIGHTING NETWORK FOR GENERATING LIGHT AVATARS

(75) Inventors: Damien Gerard Loveland, Richmond (CA); Arend Jan Wilhelmus Abraham Vermeulen, Drachtster Compagnie (NL); Aloysius Cornelis Arnoldus Maria Ketelaars, Breda (NL); Ian Edward Ashdown, West Vancouver (CA); Martijn Marius Hultermans, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 345 days.

(21) Appl. No.: 14/128,784

(22) PCT Filed: Jun. 25, 2012

(86) PCT No.: PCT/IB2012/053183
§ 371 (c)(1),
(2), (4) Date: Dec. 23, 2013

(87) PCT Pub. No.: WO2013/001432
PCT Pub. Date: Jan. 1, 2013

(65) Prior Publication Data
US 2014/0132390 A1    May 15, 2014

Related U.S. Application Data

(60) Provisional application No. 61/502,520, filed on Jun. 29, 2011.

(51) Int. Cl.
*H05B 37/02* (2006.01)
(52) U.S. Cl.
CPC .......... *H05B 37/02* (2013.01); *H05B 37/0227* (2013.01); *Y02B 20/48* (2013.01)

(58) Field of Classification Search
None
See application file for complete search history.

(56) References Cited

U.S. PATENT DOCUMENTS

| 6,016,038 A | 1/2000 | Mueller |
| 6,879,883 B1 * | 4/2005 | Motoyama ............... H02J 1/14 700/286 |

(Continued)

FOREIGN PATENT DOCUMENTS

| JP | 2007086545 A | 4/2007 |
| WO | WO0022860 A1 | 4/2000 |

(Continued)

OTHER PUBLICATIONS

Gluhak A. et al., "UbiClub A Context-Aware Environment for Nightclub Entertainment and Management", Capturing Context and Context Aware Systems and Platforms—Joint e-Sense, Magnet Beyond, Daidalos, and Cruise Workshop, Mykonos Island, Greece, Jun. 8, 2006.

(Continued)

*Primary Examiner* — Benjamin C Lee
*Assistant Examiner* — Rajsheed Black-Childress
(74) *Attorney, Agent, or Firm* — Meenakshy Chakravorty

(57) ABSTRACT

Disclosed is an intelligent lighting network for facilitating operation of a lighting system including at least one controllable light source and configured to generate light representing light avatars uniquely associated one or more users of a plurality of users. The light avatar is a light pattern suitable to represent the user and/or convey information about the user to other users.

18 Claims, 15 Drawing Sheets

(56) References Cited

U.S. PATENT DOCUMENTS

| | | | |
|---|---|---|---|
| 7,418,268 B1 | 8/2008 | Cabano | |
| 7,576,727 B2* | 8/2009 | Bell | G06F 3/011 |
| | | | 345/156 |
| 2008/0030496 A1* | 2/2008 | Lee | G06Q 10/10 |
| | | | 345/418 |
| 2008/0303687 A1* | 12/2008 | Sempel | H05B 37/0245 |
| | | | 340/539.22 |
| 2009/0111438 A1 | 4/2009 | Chan | |
| 2009/0307592 A1 | 12/2009 | Kalanithi | |
| 2010/0026624 A1* | 2/2010 | Bell | G06F 3/011 |
| | | | 345/156 |
| 2010/0115426 A1 | 5/2010 | Liu | |
| 2010/0121866 A1* | 5/2010 | Bell | G06F 3/0425 |
| | | | 707/758 |
| 2010/0201267 A1 | 8/2010 | Bourquin | |
| 2010/0218094 A1* | 8/2010 | Ofek | A63F 13/12 |
| | | | 715/706 |
| 2013/0086488 A1* | 4/2013 | Piccionelli | G06F 3/04815 |
| | | | 715/753 |

FOREIGN PATENT DOCUMENTS

| | | |
|---|---|---|
| WO | WO2010027250 A2 | 3/2010 |
| WO | WO2010079388 A1 | 7/2010 |
| WO | WO2010122440 A2 | 10/2010 |

OTHER PUBLICATIONS

Kim Sung Ah et al., "Bridging the Physical and the Virtual: Creating a Social Network via Media-Enhanced Street Furniture", Real Corp 2010 Proceedings/Tagungsband Vienna, May 18-20, 2010 http://www.corp.at.

* cited by examiner

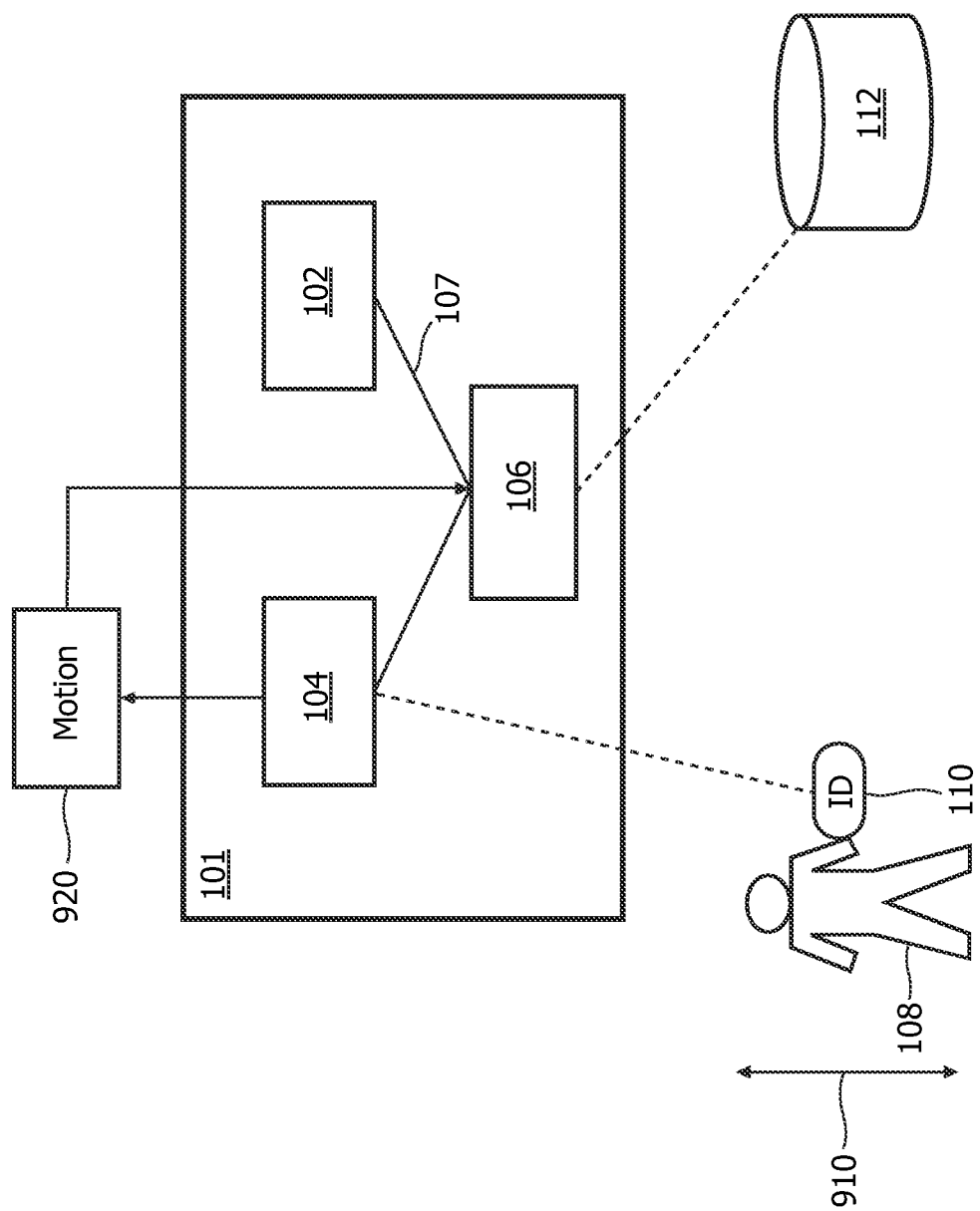

INTELLIGENT LIGHTING NETWORK FOR GENERATING LIGHT AVATARS

TECHNICAL FIELD

The present invention is directed generally to controllable lighting systems. More particularly, the present invention is directed to systems and apparatus for generating personal information applicable to controllable lighting networks.

BACKGROUND

Digital lighting technologies, i.e. illumination based on semiconductor light sources, such as Light-Emitting Diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a processor for independently controlling the output of the LEDs in order to generate a variety of colors and color-changing lighting effects, for example, as discussed in detail in U.S. Pat. Nos. 6,016,038 and 6,211,626.

Recent developments in digital lighting technologies such as LED-based lighting systems have made the precise control of digital or solid-state lighting a reality. Consequently, light-based systems are used today that are programmed to react to certain events or to implement a user's previously-entered preferences.

From a user's perspective, disclosed systems and techniques for implementing lighting control often offer little more than lamp dimming according to previously entered preferences. For example, in disclosed systems and techniques, a user's lighting preferences for a specific environment can be programmed by a building administrator. The system can then control the environment's lights to implement the user's preferred lighting arrangement. In this manner, an office worker who prefers to have his or her workspace brightly lit, or alternatively, dimly lit, can have the system programmed accordingly by an administrator. Similarly, administrators can schedule "on" and "off" time periods according to a user's work schedule to save energy.

As an additional example, one known system features direct-indirect fluorescent luminaires with integrated occupancy and daylight sensors that communicate with a central controller via an RS-485 hardwired network. The central controller then communicates via a local area network (LAN) with desktop computers. This system enables office workers to dim task (direct) and ambient (indirect) lighting over their workstations and turn task and ambient lighting on and off using personal lighting control software installed on their computers. The system also permits office managers to: assign control to individual luminaires, groups, areas, and the entire lighting network; enable and disable luminaire daylight sensors; enable and disable luminaire occupancy sensors; specify occupancy sensor delay times; independently specify task and ambient lamp control; enable and disable load shedding; generate detailed energy consumption reports; and schedule daily, weekly, monthly, and annual events. In this sense, this system and similar conventional products may be considered as extensions of building management systems that also manage HVAC and security subsystems.

Lighting systems have been disclosed that cause lighting controllers to execute a command or a set of commands, sometimes called a lighting script, upon the detection of the occurrence of an event or according to predetermined time sequences. For example, one disclosed system employs software that enables a lighting designer to create a lighting script by specifying changes in color and intensity of multiple luminaires over time and a memory that stores the lighting script for later execution. Lighting controllers for theatrical and entertainment venues enable a lighting designer to record and edit time sequences for hundreds or thousands of luminaires. Lighting systems have also been disclosed that include the ability to execute prerecorded lighting scripts in response to external events, such as, for example, switch closures, analog signals, and network commands. One disclosed system activates or adjusts lights upon the detection of the receipt of an e-mail, the receipt of a telephone call, or an alarm going off. Another disclosed system activates lights using voice or word recognition; yet another implements a light pattern upon detection of a person making gestures. Lighting controllers in such systems may include simple logic functions or conditions, such as a logic function that executes a lighting script only when two events or conditions occur at the same time. For example, a lighting script may be executed if a proximity switch is triggered and a photosensor indicates that it is after sunset. Such lighting scripts, however, do not change after they are recorded unless a lighting designer manually changes them.

Lighting systems also have been disclosed wherein a person can input his or her lighting preferences for a specific location, and a central controller can execute a lighting script to instruct LEDs or other light sources and implement the person's preferences. In one disclosed system, lighting systems may receive inputs indicating the presence of a person, the duration of the person's presence, or identifying the presence of a particular person or persons present in the location by, for example, the magnetic reading of name badges or a biometric evaluation. Disclosed systems may then implement different lighting scripts depending upon whether a person is present, how long the person is present, and which person is present. These systems may also select different lighting scripts depending on the number of persons in a room or the direction the people are facing. In one disclosed system, lighting devices and other energy sources are turned on or off depending on information in a person's electronic calendar.

Some disclosed lighting systems can receive information regarding a person's presence or the person's preferences from a device carried by a user. For example, in some disclosed systems, a card reader can detect the presence of a card carried by a user, which can then cause the system to turn a light on when, for example, the user enters a room and turn off the light when the user exits the room. In other disclosed lighting systems, user's preferences are stored on a mobile device or card. As the user travels, data can be transferred to devices and systems capable of conforming parameters under their control to the stored preferences (e.g., dim lights or change their color), either through automatic detection of the card or, in other systems, by inserting the card into a card reader.

However, in various disclosed systems, implementing user preferences or implementing lighting scripts upon the occurrence of an event, the preferences or scripts are either (1) specific to a particular location and not executable in a different location or (2) necessarily transported by a user in order to be implemented in different locations or in different networks. As such, there are no systems that permit a user's preferences or a lighting script to be implemented in a system other than those in which the user's preferences were programmed unless the user carries a device storing his or her preferences.

Furthermore, lighting systems have been disclosed that can monitor users' activities and sensed environmental parameters to learn the user's preferences for a specific environment. For example, some systems can monitor how a user has maintained or selected settings in a given environment for a period of time to create user preferences for that environment. In other known systems, devices may follow a lighting script unless a particular action is detected. Other systems can monitor how a user reacts to a given set of environmental circumstances and create a rule for future implementation in that environment. One disclosed lighting control system has both autonomous control and event-based control. This system is disclosed as implementing a fuzzy control system, wherein rules in a rule base determine system output based upon fuzzy inputs or the occurrence of events. However, there is currently no way for systems at remote locations to take advantage of preferences learned by other systems other than by a user carrying a device holding his or her preferences.

As such, there are deficiencies associated with the known systems. For example, known systems generally relate to stand-alone, self-contained systems for controlling lighting or other devices. For a user's preferences to be implemented in another environment, or for learned parameters to be implemented in another environment, a user must carry around a device storing his or her preferences. As such, one disadvantage of these disclosed systems is the inability to share learned parameters, including information learned by monitoring individual and system actions, with other systems.

Some conventional lighting systems can receive information regarding a person's presence or the person's preferences from a device carried by a user. For example, in some disclosed systems, a card reader can detect the presence of a card carried by a user, which can then cause the system to turn a light on when, for example, the user enters a room and turn off the light when the user exits the room. In other disclosed lighting systems, a user stores his or her preferences on a mobile device or card. As the user travels, data can be transferred to devices and systems capable of conforming parameters under their control to the stored preferences (e.g., dim lights or change their color), either through automatic detection of the card or, in other systems, by inserting the card into a card reader.

However, advances in digital lighting technologies that have given rise to precisely controllable lighting, open a possibility to control light for variety of different purposes that goes beyond mere adjusting the light according the person's presence.

SUMMARY

Applicants herein generally recognized that a lighting system can be used to uniquely identify a user in an environment affected by the lighting system and/or convey information about one user to other users within the environment. Such user identification and/or information can be encoded and visually represented, e.g. as a light symbol or lighting pattern, and generated in the environment to be observed by the other users. This disclosure refers to such light pattern as a "light avatar". An example of the lighting system capable of generating such avatars is an interactive modified immersion (IMI) system disclosed in International Application No. PCT/IB2009/052811, filed on Jun. 29, 2009 and incorporated herein by reference.

The light avatars can be used to convey various kinds of user's information. For example, the light avatar can indicate an identity of the user, such than when the light avatar is generated in an environment affected by the lighting system, e.g., a restaurant or a hotel lobby, other users can understand that the user is present in that environment. Furthermore, various light avatars can indicate profile of the user and/or interests of the user, such as profession, gender, hobby, and the light representing such light avatars communicates that information to the other users in the environment. Examples of the light avatar are an image of a face of the user, an icon representing the user, icon representing a profession or a hobby of the user, or text conveying information about user. In various embodiments of the invention, one or many light avatars of the user can be concurrently generated by the lighting system.

Applicants further recognized that one or many light avatars of the user can be stored in a memory, e.g., a database, and be reused multiple times by the lighting network or across multiple lighting networks. The light avatar can be retrieved from the memory based on an identifier for the user. The identifier can be provided to the lighting network by the user during an operation of the lighting network. Additionally or alternatively, a component of the lighting network can automatically detect the identifier for the user upon, e.g., the user entering the environment.

Applicants further recognized that additional information about the user can be conveyed based on a location of the user in the environment. For example, some embodiments determine the location of the user in the environment and generate the light avatar to a viewing location associated with the location of the user. For example, the light avatar can be generated toward the location of the user or toward a predetermining view location near the location of the user assisting other users to locate the user in the environment. Additionally or alternatively, the lighting system can track a motion of the user, and redirect the light representing the light avatar based on that motion.

Applicants further recognized that the light avatars can facilitate social contacts among people. For example, for some people, meeting others face to face for the first time is a difficult experience. For example, it maybe difficult to select a topic of interest to start a conversation. Some embodiments of the invention address those disadvantages, by, e.g., generating a light avatar indicating a conversation starter and/or area of interests of the user.

As an example, a person who has just lost his job would like to communicate to all potential employers that she is interested in getting a job and also the type of work she does. By enabling the lighting system to generate a light avatar that communicates the user's interest in job opportunities, potential employers presented in the environment of the lighting system are made aware of such an interest without soliciting on the part of the job seeker.

Applicants further recognized that the light avatars can be used to match people in real time based on their mutual interests such as business, interests and hobbies. For example, the lighting system can compare information of multiple users, and generate, in proximity to each other, light avatars of users with matching parameters. An example of a parameter can be a presence of a specific avatar of the user in the memory. For example, if the memory associated with two users in the environment includes, for each user, a light avatar representing an interest to rock climbing, the light avatars of the users can be displayed in proximity to each other.

Applicants further recognized that there is a need for a user to control the generation of user's light avatars. For example, the user can create a schema stored in the memory and associated with the identifier for the user, to control the generation of the light avatars. For example, the schema can prohibit the lighting system to generate some or all of user's light avatars, or prohibit generating the light avatar if another specific user is present into the environment.

Applicants further recognized that there is a need for a marketplace for light avatars, such that the light avatars can be produced, distributed, shared, controlled and protected against unauthorized copying. The market place can be an online marketplace. The market place can include a payment module such that designers of the light avatars can be paid.

Thus, Applicants herein generally recognized that there is a need in the art to combine advances made in controllable lighting technology with advances made in communications technology, because conventional solutions in the fields of lighting control and the electronic communications do not fully leverage advantages provided by the advances in both fields, choosing instead to focus on one at the exclusion of the other. Applicants, however, appreciated that a combination of controllable lighting and electronic communications technologies has the capacity to provide particularly advantageous solutions in a multitude of circumstances where either technology operating alone is not fully leveraged.

Applicants specifically recognized a need in the art for systems, methods, and apparatus for deriving and implementing personal information for controllable lighting without requiring that the user take the time to identify and enter the information during the operation of the lighting system. In particular, no system currently known to the Applicants permits a user to encode personal information in a form of light avatars recognizable by other users, and then share this information with other users via controllable lighting systems and networks.

Applicants recognized that if the light avatars were permitted to be generated by controllable lighting systems, the social experience of the users can be enhanced. Thus, there is an unfulfilled need in the art for systems, methods, and apparatus for sharing such user information via controllable lighting systems and networks.

Generally, in one aspect, the present disclosure is directed to a lighting network for facilitating operation of a lighting system including at least one controllable light source and configured to generate light representing light avatars associated with a plurality of users. The network includes a memory for storing at least one identifier uniquely associated with at least one user of the plurality of users, an executive module configured to retrieve data representing at least one light avatar uniquely associated with the at least one user and to generate, based on the data, a control signal for controlling output settings of the at least one light source, and at least one processor configured to execute the executive module, such that, during the operation of the lighting system, at least portion of the light generated by the controllable light source represents at least one light avatar, wherein the data is retrieved from the memory based, at least in part, on the identifier. The light avatar can be a light pattern of a symbol suitable to be generated by the lighting system.

In one embodiment the processor of the lighting network is further configured to execute an awareness module for supplying the identifier for the user to the executive module. The awareness module can include a sensor unit for detecting the identifier for the user. Additionally, the awareness module can include a location unit for determining a location of the user in the environment. In this embodiment, the executive module controls the light source to generate the light avatar into a viewing location associated with the location of the user. Additionally or alternatively, in one embodiment, the executive module controls the lighting source to generate the light avatar according to a set of parameters.

In another aspect, the present disclosure is directed to a lighting network configured to generate light representing light avatars of a plurality of users. The lighting network includes an awareness module for detecting an identifier for a user, at least one light source having controllable output settings, and an executive module in communication with the awareness module, with the light source and with a memory for storing data representing at least one light avatar associated with the identifier for the user. The executive module receives the identifier of the user from the awareness module, retrieves the data representing the light avatar from the memory based on the identity of the user, and generates a control signal for controlling the output settings of the at least one light source according to the retrieved data, such that during an operation of the lighting system at least portion of the light represents the light avatar.

In one embodiment, the awareness module determines a location of the user, and the executive module controls the light source to direct the portion of the light representing the light avatar toward the location of the user. In another embodiment, the awareness module tracks a motion of the user, and the executive module redirects the portion of the light representing the light avatar based on the motion.

In some embodiments, the lighting network is configured to generate the light into an environment partitioned into a set viewing locations associated with a set of locations of the users, wherein the awareness module determines a location of the user in the environment, and wherein the executive module controls the light source to generate the light avatar at the viewing location associated with the location of the user. In various embodiments, the control signal for controlling the light source is suitable to individually control pixels generated by the lighting source.

In another embodiment, the executive module retrieves the data representing a plurality of light avatars of the user, and controls the lighting source to generate the plurality of light avatars according to a schema. In alternative embodiment, the executive module retrieves the data representing the plurality of light avatars of the plurality of users, and controls the lighting source to generate the plurality of light avatars according to a schema.

In yet another embodiment, the memory includes a first set of parameters associated with the identifier for the user, and the executive module controls the light avatar of the user according to the first set of parameters. In one variation of this embodiment, the executive module controls the light avatar of the user according to a second set of parameters associated with an identifier for another user. In another variation, the executive module controls the light avatar of the user according to a result of comparison of the first set of parameters with the second set of parameters.

In yet another embodiment, the executive module is configured to redirect the portion of the light representing the light avatar in response to a change in at least one of the first set of parameters and the second set of parameters. Additionally or alternatively, the executive module is configured to change the output settings of the light source in response to a change in a location of the user. In one embodiment, the memory includes a remote memory.

In another aspect, the present disclosure is directed to a method for generating a light avatar of a user, wherein the light avatar is a light pattern of a symbol encoding information about the user. The method is executed by a processor and includes detecting a location of a user in an environment; determining an identifier for the user; retrieving from a remote memory data representing at least one light avatar associated with the identifier; and generating a light pattern representing the light avatar toward the location of the user in the environment.

The information encoded in the light avatar includes one or combination of an identity of the user, a gender of the user, an age of the user, a hobby of the user, an occupation of the user, and interest of the user.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 9 illustrates a block diagram of generating light avatars based on a motion of the user in the environment according to embodiments of the invention.

DETAILED DESCRIPTION

Reference is now made in detail to illustrative embodiments of the invention, examples of which are shown in the accompanying drawings. Various implementations of the present technology and related inventive concepts are described below, including certain implementations relating to interactive lighting networks that are aware of their environments. Such networks are particularly suitable for intelligent lighting in bars, restaurants, stadiums, exhibition centers, museums, shops, shopping centers, night clubs, dance halls, public transport, waiting areas, transition environments, airports, among other applications. It should be appreciated, however, that the present disclosure is not limited to any particular manner of implementation, and that the various embodiments discussed explicitly herein are primarily for purposes of illustration.

Applicants generally recognized and appreciated that a lighting system can be used to convey information about one user located within an environment affected by the lighting system to other users within the environment. Such information can be encoded as a light pattern of a symbol suitable to be generated by the lighting system and the light representing this light pattern can be generated in an environment to be observed by the other users. This disclosure refers such light pattern as a light avatar. An example of the lighting system is an interactive modified immersion (IMI) system.

Figure 1:
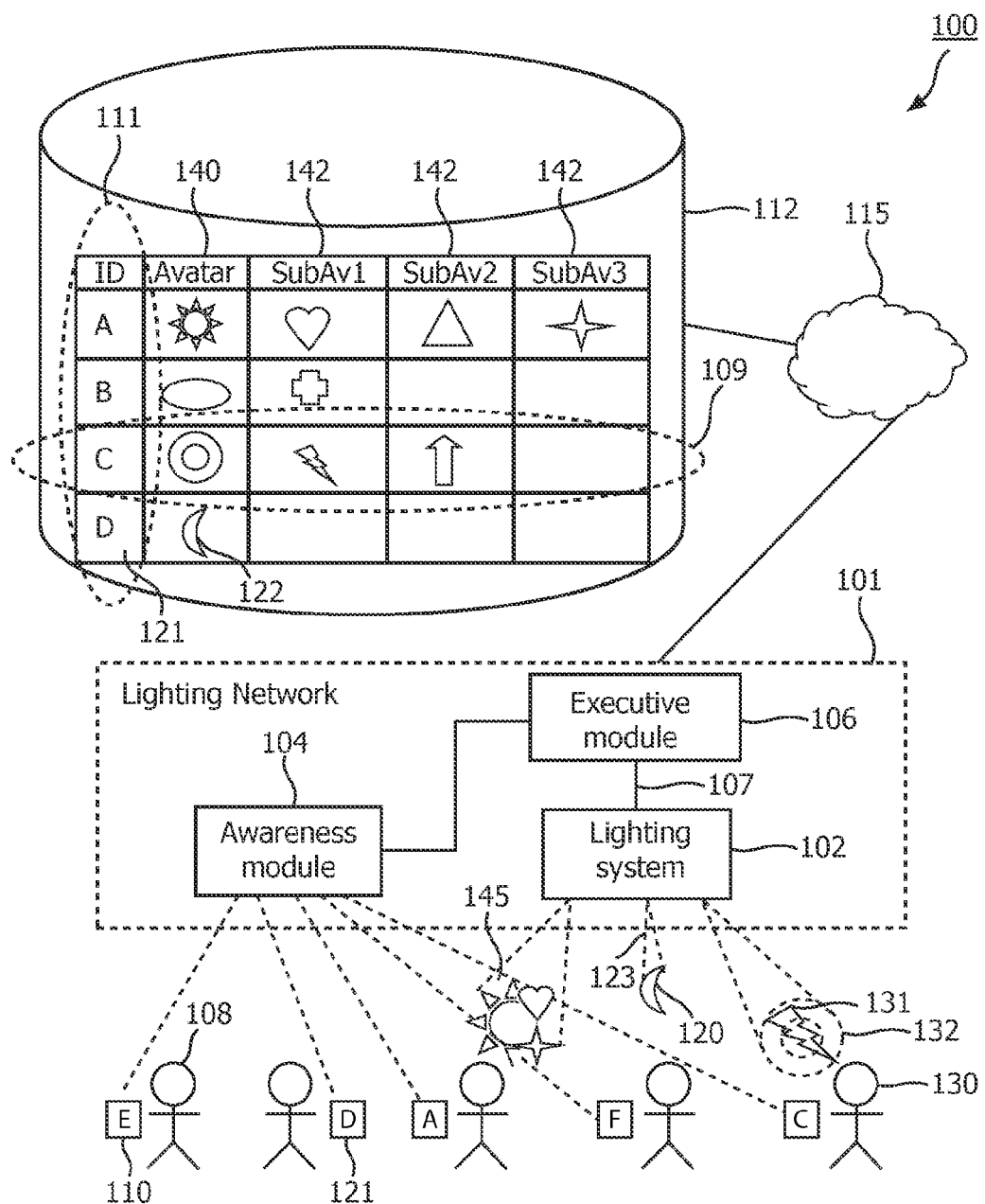
FIG. 1 illustrates a block diagram of an exemplary IMI system according to some embodiments of the invention.

FIG. 1 illustrates a block diagram of an exemplary IMI system 100 according to embodiments of the invention in which one or many light avatars of a user are stored in a memory 112. Referring to FIG. 1, in one embodiment, IMI system includes exemplary lighting network 101, which includes a lighting system 102, an awareness module 104, and an executive module 106. The term "network" as used herein refers to any interconnection of two or more devices (including controllers or processors) that facilitates the transport of information (e.g. for device control, data storage, data exchange, etc.) between any two or more devices and/or among multiple coupled devices. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout lighting network 101.

Lighting system 102 may be any system affecting an environment including a system for providing one or more of: illumination, luminance, or a combination of illumination and luminance. In one embodiment, lighting system 102 may further include a system affecting the environment of an environment including, but not limited to, a system for providing one or more of: fragrance, heating, ventilation, cooling, television, background music, and/or sound. Lighting system 102 may include one or more light sources such as one or more LEDs or luminaires, in communication over lighting network 101. In one embodiment, lighting system 102 includes at least one light source having a controllable output setting. For example, lighting system 102 may include a luminaire configured to vary its photometric output or a luminaire configured to render light distribution patterns. One or more of the light sources in the lighting system may also have one or more manual controls such as on/off switches or dimmers. Any adjustments to these manual controls by a user, and the context for any such adjustments, may be monitored by executive module 106 and used as input for learning patterns and preferences of the users within the coverage area of lighting network 101.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination light source" is a light source that is particularly configured to generate radiation having a sufficient intensity to effectively illuminate an interior or exterior environment. In this context, "sufficient intensity" refers to sufficient radiant power in the visible spectrum generated in the environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "lighting fixture" or "luminaire" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

There are many known intelligent light sources and luminaires that could be used as part of lighting system 102 within lighting network 101. In one embodiment, lighting system 102 includes luminaires comprising solid state light-emitting elements. Any such luminaire may have individually controllable illumination levels for one or more of its constituent wavelengths, so that a wide range of colors, brightness levels and color temperatures can be produced. For example, an LED luminaire could include red, green and blue LEDs. Other types of lighting could also be incorporated into the network, such as fluorescent or incandescent lighting. Some examples of such light sources are Lexel LED DLM system and COLORBLAST/iW Blast lighting fixtures available from Royal Philips Electronics, N.V.

As mentioned above, the term "light-emitting element" is used to define any device that emits radiation in any region or combination of regions of the electromagnetic spectrum for example, the visible region, infrared, and/or ultraviolet region, when activated by applying a potential difference across it or passing a current through it, for example. Therefore a light-emitting element can have monochromatic, quasi-monochromatic, polychromatic or broadband spectral emission characteristics. Examples of light-emitting elements include semiconductor, organic, or polymer/polymeric light-emitting diodes, blue or UV pumped phosphor coated light-emitting diodes, optically pumped nanocrystal light-emitting diodes, laser diodes or any other similar light-emitting devices as would be readily understood by a worker skilled in the art. Furthermore, the term light-emitting element is used to define the specific device that emits the radiation, for example a LED die, and can equally be used to define a combination of the specific device that emits the radiation together with a housing or package within which the specific device or devices are placed.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic Light-Emitting Diodes (OLEDs), electroluminescent strips, and the like. In particular, the term LED refers to Light Emitting Diodes of all types (including semiconductor and organic Light-Emitting Diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light-emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

Lighting system 102 may be controlled using a communication protocol such as DALI, DMX, or Zigbee, or using another lighting or device control protocol. As discussed above, lighting network 101 may communicate over wireless and/or over wired connections. Wireless connections may be radio frequency (RF), for example Bluetooth, or they may be modulated optical signals superimposed on illumination light output of lighting system 102.

In one embodiment, lighting system 102 is connected over lighting network 101 to the awareness module 104. In one embodiment, the awareness module 104 determines an identifier 110 for a user 108. In one embodiment, the awareness module 104 detects the identifier for the user by detecting biometric data, such as fingerprint data or iris data corresponding to the user 108. In another embodiment, the awareness module includes a video camera that uses face recognition software to identify the user based on facial features of the user 108. In yet another embodiment, the awareness module detects the identifier 110 for a user by detecting a personal identifier carried by user 108. In one embodiment, the personal identifier is radio-frequency identification (RFID) card, a badge or device adorned with a bar code, or a portable device, such as mobile phone carried by the user. In some embodiments, the awareness module 104 includes a user interface for enabling the users to provide their identifiers.

An identifier ("ID") for the user is a unique expression either by a code, by numbers or by the combination of both to distinguish the user from other users. An example of the identifier 110 is a lexical token.

In various embodiments, the awareness module 104 senses one or more system parameters including, for example, parameters relating to people, behavioral parameters or data, environmental parameters or data, and feedback parameters or data for lighting system 102. Although not an exclusive list, the awareness module 104 may sense one or any combination of the following parameters: the presence of one or more people, the identity of one or more people, a physical characteristic of one or more people, such as a blood vessel pattern in a person's body, a location of one or more people, a time of presence of one or more people, gestures of one or more people, motions and actions of one or more people, faces of one or more people, sounds emitted by one or more people or from other sources, an output from at least one of the light sources, a level of ambient lighting, an amount of daylight, a motion, a temperature, a humidity level, weather, and a noise. The awareness module 104 may include, for example, one or more of the following: a sensor, such as motion sensor, a video camera, a thermometer; a hygrometer for measuring humidity; an anemometer for measuring air speed; a phonometer for measuring noise levels; a lux meter for measuring illumination values; a gas probe for measuring the concentration of certain chemicals, such as $CO_2$ or CO concentration; a detector for detecting daylight; and an external weather sensor such as a rain detector.

Executive module 106 is connected over lighting network 101 to lighting system 102 and awareness module 104; and accordingly, executive module 106, awareness module 104, and lighting system 102 may be said to form part of lighting network 101. Executive module 106 may be implemented in numerous ways (e.g., such as with dedicated hardware) to perform various functions discussed herein. In one example, the executive module includes one or more microprocessors that may be programmed using software (e.g., microcode) to perform various functions discussed herein. In another example, the executive module includes a combination of dedicated hardware to perform some functions and a controller or processor (e.g., one or more programmed microprocessors and associated circuitry) to perform other functions. Examples of executive module 106 components that may be employed in various embodiments of the present disclosure include, but are not limited to, conventional microprocessors, application specific integrated circuits (ASICs), and field-programmable gate arrays (FPGAs).

The executive module 106 can further receive an input from the awareness module or from the memory that causes the executive module to select or alter the schema of generating light avatars of the user. A schema is a set of one or more rules of operation of light sources and sensors. As used herein, a rule may include an antecedent condition statement that, when satisfied, allows the inference of other consequent information. As such, the executive module 106 can be thought of as an expert system that includes or constitutes an inference engine, which can infer information based upon sensed or determined conditions. The format for such rules may be:

IF <antecedent> THEN <consequent>

The antecedent conditions may be determined via input provided by the awareness module 104. Executive module 106 can examine existing facts or conditions to infer new facts or consequent information, e.g.:

IF <rain detector detects 0.01 oz liquid precipitation>
 THEN <weather=rain>

The inference of the consequent information may satisfy another condition in accordance with user or system preferences, e.g.:

IF <weather=rain> THEN <show avatar=NO>

Figure 3:
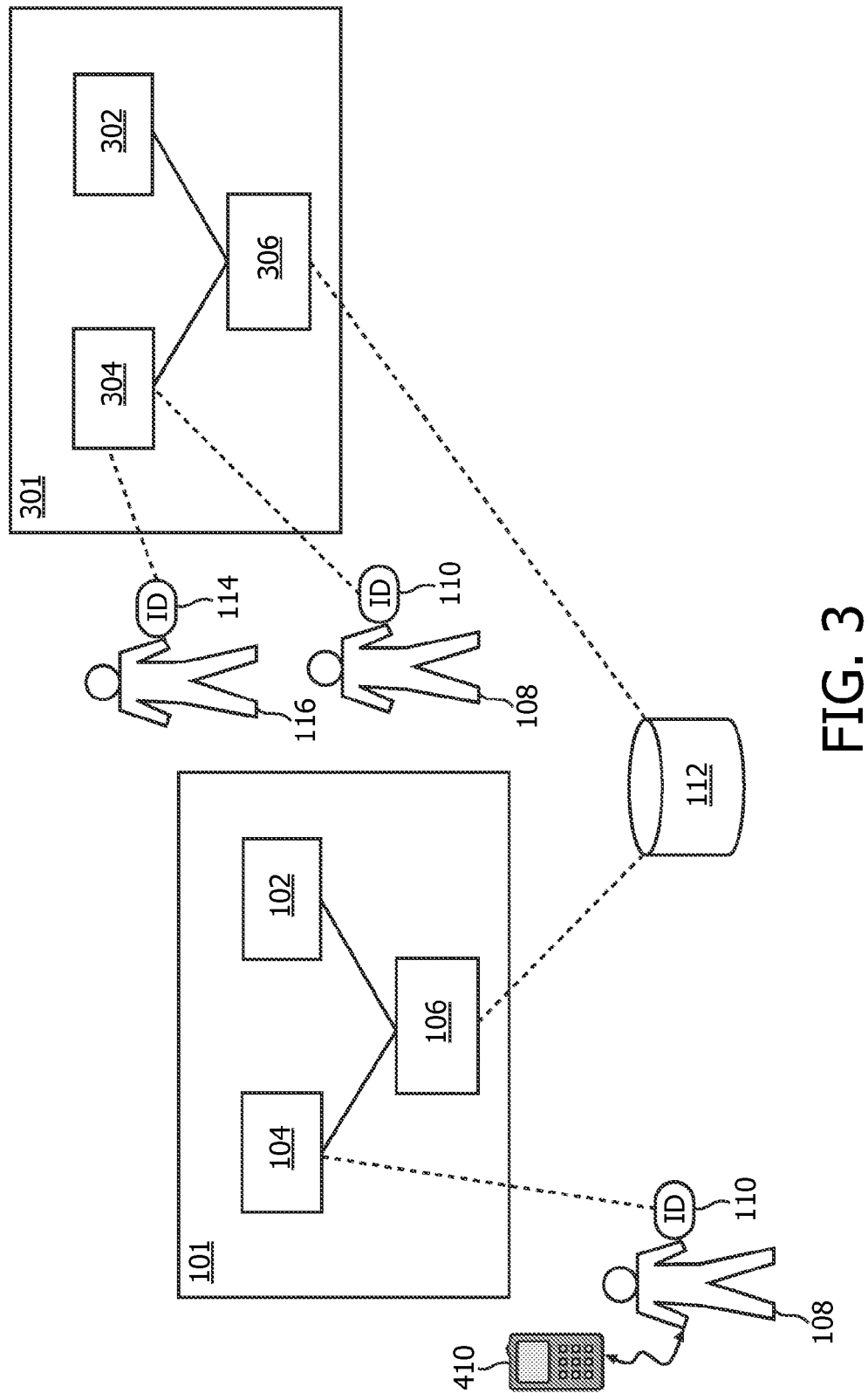
FIG. 3 illustrates a block diagram of lighting network according to embodiments of the invention that allows the user to share light avatars with another lighting network.

Rules and/or schemata may be set by the users and can have various kinds of forms and conditions. For example, the schema can prohibit the lighting system to generate some or all of user's light avatars, or prohibit generating the light avatar if a specific user is present into the environment. See, for example, an additional user 116 having an identifier 114, as shown in FIG. 3. The schema can also regulate the mode of displaying multiple light avatars of the user. For example, light avatars can be generated sequentially, i.e., one by one, or concurrently, e.g., light avatars overlapped each other.

One or more components of lighting system 102 may be preprogrammed with a set of default rules defining default behavior for one or more light sources. These default rules may be overridden or modified by rules denoted with a higher priority that are specified by the user or the lighting designer. The default rules may also be modified or replaced by rules that the system developed by itself as it learns about its environment and users.

In one embodiment, a markup language such as XML or a similar language may be used for creating schemata. The language used to create schemata may incorporate SQL commands for accessing memory 112. One of skill in the art will appreciate that other programming languages could be used to create schemata, such as, but not limited to, Visual Basic, C++, etc.

Lighting network 101 is in communication with the memory, 112, which in one embodiment is located at a location remote from lighting network 101 and operatively connected to the lighting network through intranet or internet 115. In one embodiment, the memory 112 stores data representing light avatars, e.g., the light avatars 109, for a plurality of users. Each light avatar is associated with the user using an identifier for the user, e.g., the identifiers 111. The memory 112 may be a database, register or other data storage element.

The memory 112 may be in a server connected to the Internet, and may store multiple light avatars for multiple people. In one embodiment, lighting network 101 can access the memory but cannot control it. In one embodiment, user 108 has access to the memory 112, and can change the user's light avatars and/or schema by, for example, a user interface. For example, user 108 may access preference data stoic 112 over the Internet.

In some embodiments, the executive module 106 controls one or more of the light sources in lighting system 102 of lighting network 101 in response to input from awareness module 104. For example, the executive module 106 module receives the identifier 121 of the user from the awareness module 104, retrieves the data 122 representing the light avatar 120 from the memory 112 based on the identifier 121 of the user, and generates a control signal 107 for controlling the output settings of the at least one light source of the lighting system 102 according to the retrieved data 122, such that during an operation of the lighting system at least portion of the light 123 represents the light avatar 120.

The lighting network detects the presence of and identifiers for the people in the environment illuminated by the network. For example, the awareness module can include sensors for detecting the mobile communication devices of the users. The locations of the devices within the network may also be sensed if it is desired to display the light avatars in relation to the people in the environment, rather than in an unrelated position in the environment. For example, it may be desired to display the light avatars close to the owners, i.e., user who owns the light avatar, or it may be desired to display one user's light avatars close to another user.

The executive module can retrieve light avatars for each of the users within the environment according to a schema for all or each individual user. The schema may limit the number, size and intensity of light avatars, and users may opt not to have their light avatars displayed, or may control the mode that they are displayed in. Users may choose to display one, some or all of their light avatars. Light avatars may be displayed on walls, ceilings, floors, bar surfaces, tables. The display surfaces may be luminous, or they may be illuminated by projection.

The light representing multiple light avatars can be generated in numerous ways. For example, all light avatars of the user can be displayed in turn, fading in and out gradually, with a cycle time of a few seconds or even a few minutes depending on the schema. FIG. 1 shows a user 130 having an identifier "C", where the lightning avatar 131 is displayed and the doughnut avatar 132 has just disappeared.

Another embodiment partitions multiple light avatars of the user into a main avatar 140 and one or more sub-avatars 142. In one variation of this embodiment, the main light avatar is displayed continually, with the sub-avatars displayed in turn next to the main light avatar. In another variation 145 half of a main light avatar of the user is displayed, with smaller versions of sub-avatars being displayed where the other half of the main light avatar would be displayed.

In various embodiments, if more pixels and/or environment are available for illumination, several sub-avatars are displayed in the vicinity of the main light avatar. Some or all of a user's light avatars may be displayed in a straight line, a wavy line, or a curve. A smaller version of the user's main avatar may be displayed as a badge superimposed over one corner of each sub-avatar, the sub-avatars being displayed in turn.

As used herein, the "light avatar" is a light pattern of a symbol suitable to be generated by the lighting system and suitable to identify the user and/or convey information about the user to other users. For example, the light avatar can represent an attribute, interest or allegiance of the user, such than when the light representing the light avatars is generated in an environment of the lighting system, e.g., a restaurant or a hotel lobby, such light avatars communicates that information to the other users in the environment. Examples of the light avatar are image of a face of the user, icon representing the user, icon representing a profession or a hobby of the user, or a text conveying information about user. In various embodiments of the invention, one or many light avatars of the user can be concurrently generated by the lighting system. These light avatars may or may not be unique to the user.

Figure 2:
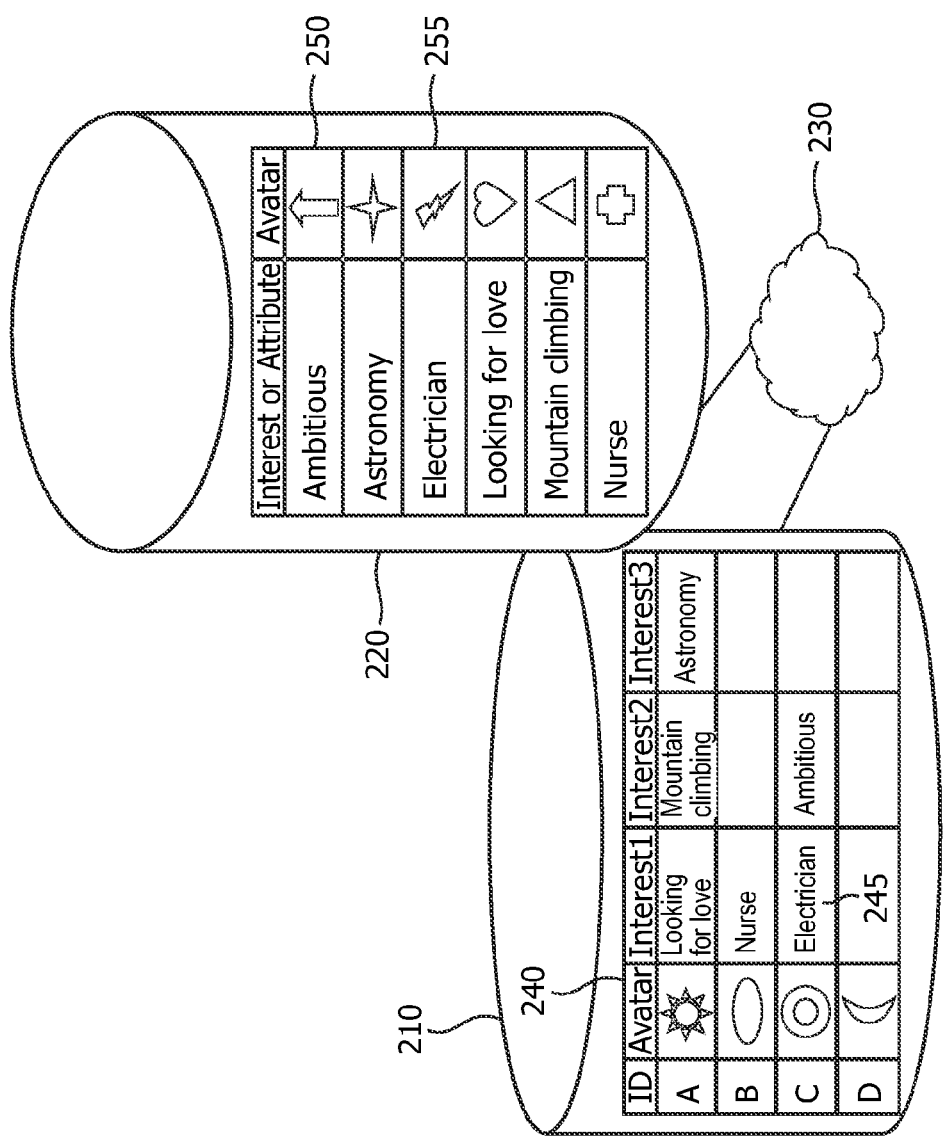
FIG. 2 illustrates a block diagram of a memory for storing light avatars according to some embodiments of the invention.

FIG. 2 shows an example of the memory 112. The memory 112 can be implemented as a database 210. The memory 112 can include one or several databases, such as databases 210 and 220 connected 230 with each other, e.g., using database keys. Additionally or alternatively, the database 210 can include one or many tables 240 for storing data representing light avatars.

Some embodiments are based on a realization that it can be advantageous for users to select light avatars representing specific information rather than to design their own light avatars. For example, in one embodiment, the memory 112 includes a preference database 240 and a language database 250. The preference database associates the identifier for the user with one or several light avatars. The language database provides light avatars that are widely or universally understood. Rather than users designing or having to select a light avatar for each of their interests, users can simply enter their interests in the preference database, e.g., an interest 245, and the corresponding light avatars, e.g., the light avatar 255, is automatically selected. The preference and language databases can be implemented, e.g., as separate databases 210 and 220, or as a different tables in one database. In one embodiment, main avatars of the users are also stored in the language database, and simply an identifier for the main avatar is included in the preference database.

FIG. 3 illustrates a block diagram of an exemplary IMI system according to embodiments of the invention where the light avatars of the user can be shared between networks. Lighting network 101 and lighting network 301 may implement the same or different schemata. As shown in FIG. 3, lighting network 301 includes lighting system 302, awareness module 304, and executive module 306. In one embodiment, a lighting network may include a set of sub-networks, such as lighting networks 101, 301, in the same or different buildings. For example, a company having a geographically distributed set of offices may have each of the lighting networks connected for centralized control or monitoring.

In some embodiments, both lighting network 101 and lighting network 301 have access to the data representing light avatars stored in the memory 112. As such, as user 108 travels to a location served by lighting network 301, executive module 306 may access the memory 112 to access light avatars of user 108. In these embodiments, a user 108 can enter the data representing light avatars in the memory 112, after which multiple networks may access the memory 112 to obtain the user's light avatars.

In addition, in some embodiments, a user may create schema for displaying light avatars. The schema can be stored in the memory 112 and associated with the identifier for the user. In one embodiment, the schema can be shared with multiple lighting networks. In another embodiment, the schema is associated with the specific network, such that the user can sore different schemas for different networks. For example, the user can create one schema for the network 101, and another schema for the network 301.

Additionally or alternatively, the user can store the schema and data representing light avatars in personal identifier 410. In these embodiments, each user interacting with a network effectively has her or his own mini data store. The collection of mini data stores is effectively equivalent to a remote, distributed database like the memory 112. In this embodiment, lighting network 301 may obtain users' light avatars from personal identifier 410.

Figure 4:
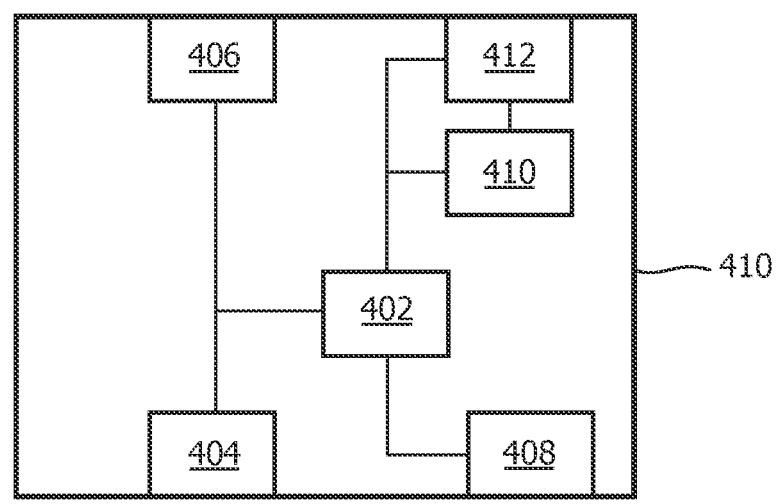
FIG. 4 illustrates a block diagram of an exemplary personal identifier according to some embodiments of the invention.

FIG. 4 illustrates a block diagram of an exemplary personal identifier 410 according to some embodiments of the invention. In one embodiment, the personal identifier is a mobile electronic communications device, such as a cellular phone, a satellite phone, a BlackBerry®, an iPhone, a Personal Digital Assistant (PDA), a pager, a laptop, a smart phone or any other electronic device with processing power and the ability to communicate. As shown in FIG. 4, the personal identifier may include controller, or microprocessor, or processor, 402, location awareness circuit 404, interface 406, memory 408, preference data memory 410, and RFID tag 412. A user such as user 108 can input his or her personal device preferences, such as the user's lighting preferences, via interface 406, which may be a user interface.

Location awareness circuit 404 in personal identifier 410 may be a Global Positioning Service (GPS) circuit. Location awareness circuit 404 may operate using assisted GPS, triangulation from WiFi or other RF signals, or, location within personal identifier 410 may be calculated from signals from accelerometers, or a location of personal identifier 410 may be determined based on a combination of these methods.

Figure 5:
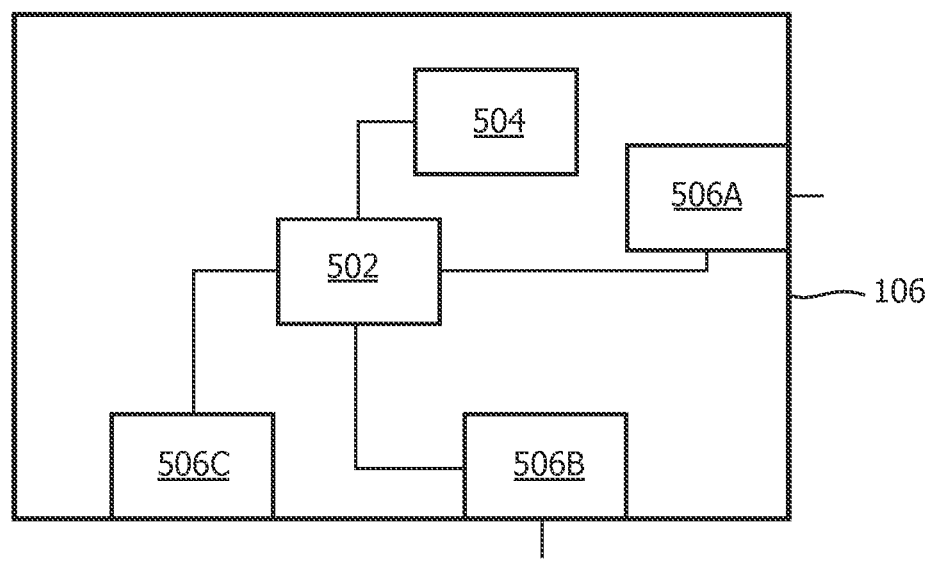
FIG. 5 illustrates a block diagram of an exemplary executive module according to some embodiments of the invention.

FIG. 5 illustrates a block diagram of an exemplary executive module 106 according to some embodiments of the invention. In one embodiment, executive module 106 includes controller, or microprocessor, or processor, 502, memory 504, and interfaces 506A, 506B, and 506C. In one embodiment, memory 504 holds computer-readable instructions for controller 502 to process in order to control the output of one or more of the light sources in lighting system 102 according to light avatar data retrieved from the memory based on the identifier detected by awareness module 104. For example, executive module 106 may control the output of the light sources according to the data representing light avatar and stored in memory 112. In one embodiment, executive module 106 arbitrates between different inputs, e.g., different inputs from varying sensors in awareness module 104. In another embodiment, memory 504 may serve as temporary or long term storage for one or more of default parameters, learned behavior, user preferences, and one or more schemata. As shown in FIG. 5, executive module 106 can have multiple interfaces, e.g., wired interface 506A and 506B, and wireless interface 506C.

Executive module 106 can be implemented via a personal or laptop computer, or it can be a standalone electronic module. In one embodiment, executive module 106 is distributed across several devices.

Figure 6:
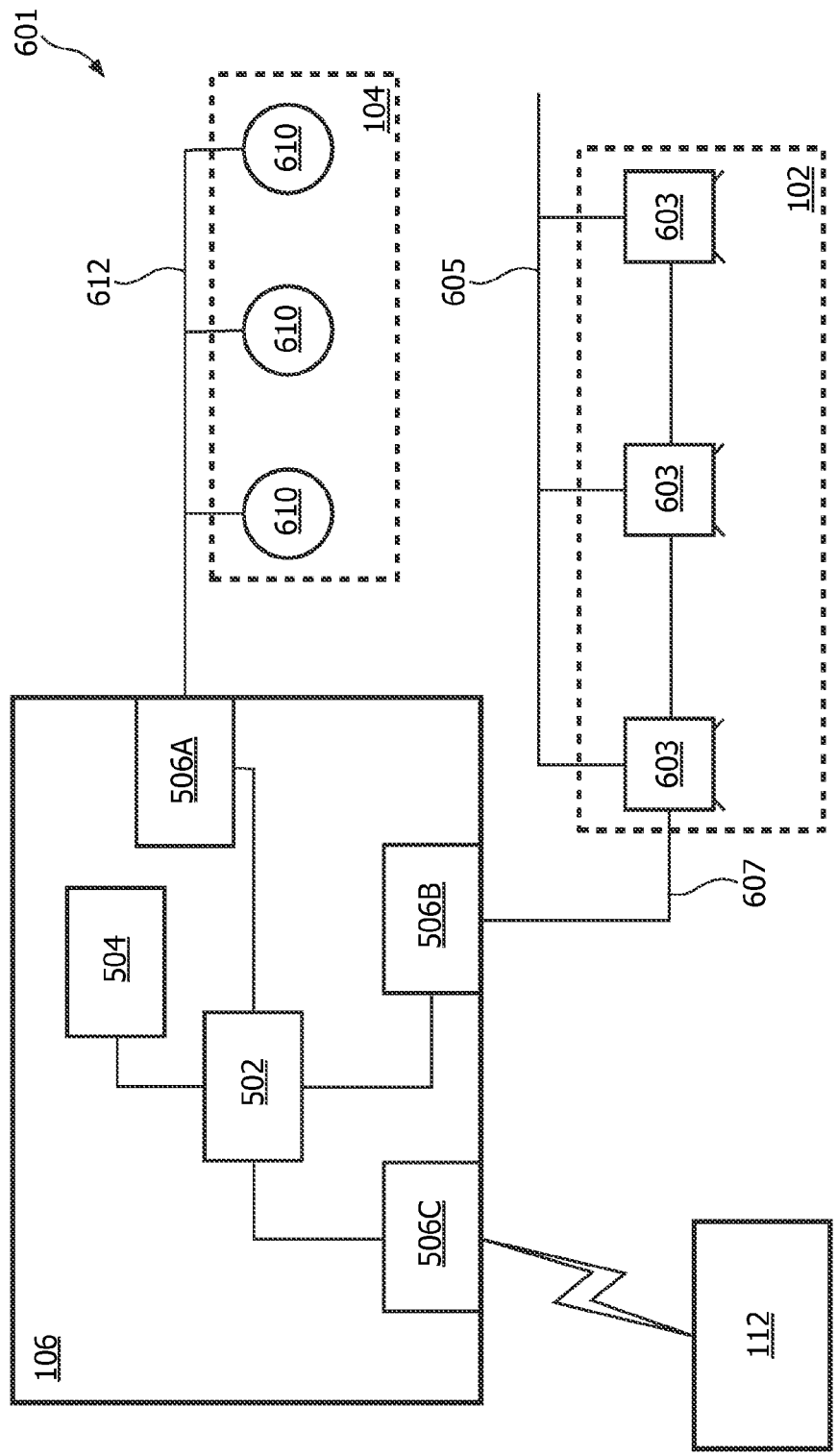
FIG. 6 illustrates a block diagram of an exemplary lighting network according to some embodiments of the invention.

FIG. 6 illustrates a block diagram of an exemplary lighting network 601 according to embodiments of the invention. As shown in FIG. 6, lighting system 102 may include one or more light sources 603 connected to a power line 605 for their source of power. In one embodiment, one or more of light sources 603 may be individually powered, such as through an individual solar panel or by a battery. Light sources 603 may also be connected to a network control line 607 and communicate via interface 506B with executive module 106. Light sources 603 comprise drivers for converting the power input into a format suitable for supplying current to the light emitting elements. Awareness module 104 may include one or more sensors 610, which are connected to the executive module 106 via a network control line 612 and interface 506A. Although awareness module 104 is shown as using a separate interface from lighting system 102, awareness module 104 and lighting system 102 may share an interface with executive module 106. Furthermore, although network control lines 607 and 612 to light sources 603 and sensors 610 are shown as hardwired, they may be wireless. FIG. 6 illustrates executive module 106 connecting to the memory 112 over a wireless communications link via interface 506C. However, one of skill in the art will appreciate that other communications links, such as a wired communications link, could be used to communicate with the memory 112.

In various embodiments of the invention, the executive module and/or awareness module can be implemented separately from the light system, as a part of a light source. In some variations of this embodiment, the executive module and/or awareness module are implemented as a part of a light source or distributed across several light sources.

Figure 7:
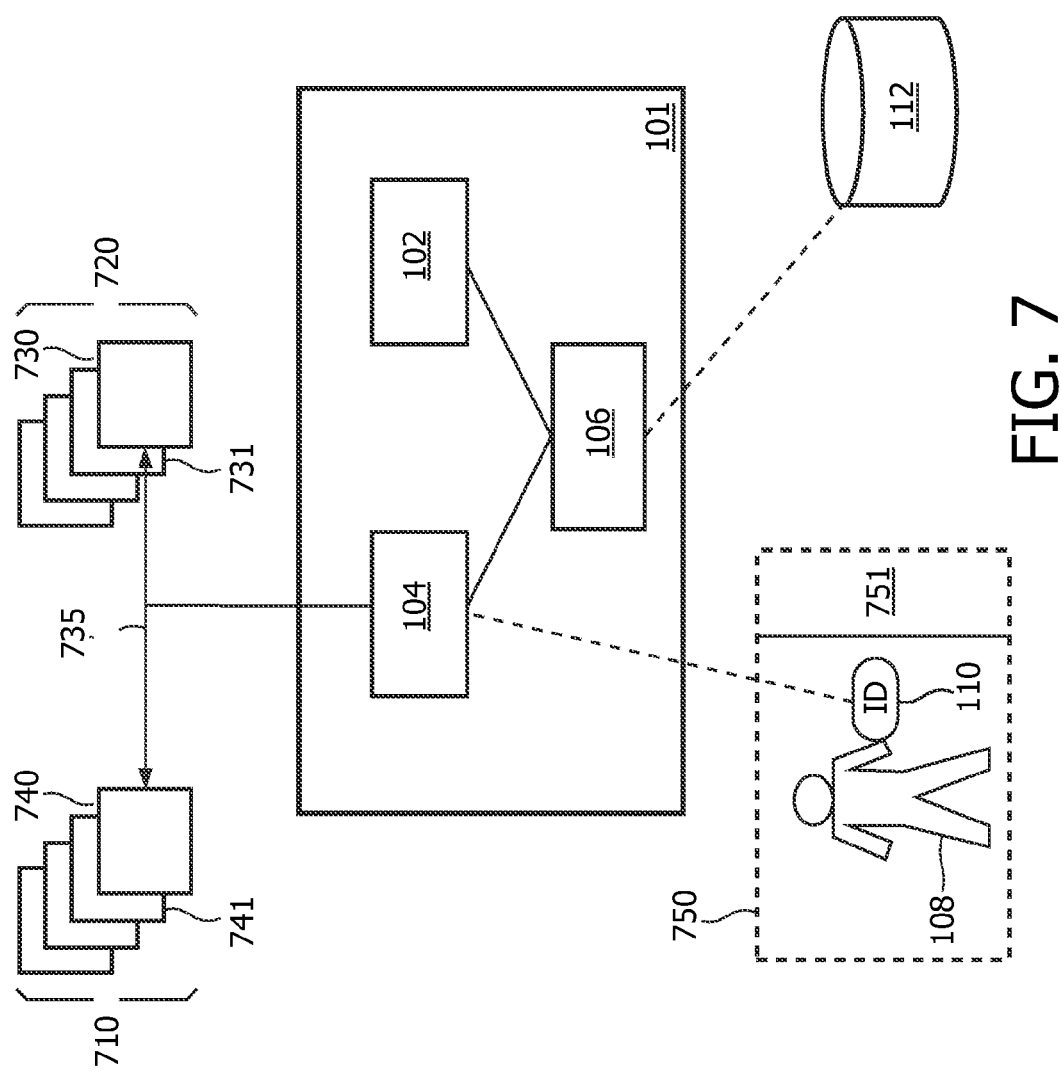
FIG. 7 illustrates a block diagram of generating light avatars based on a location of the user in the environment according to some embodiments of the invention.

FIG. 7 shows another embodiment that conveys additional information about the user based on a location 750 of the user in the environment illuminated by the light system 102. For example, some embodiments determine the location of the user in the environment and generate the light avatar to a viewing location associated with the location of the user. For example, the light avatar can be generated toward the location 750 of the user or toward a predetermining view location 751 near the location of the user.

In one embodiment, the lighting system is configured to generate the light into an environment partitioned into a set viewing locations 710 associated with a set of locations 720 of the users. For example, the awareness module 104 determines a location 730 of the user in the environment, and the executive module 106 controls the light system 102 to generate the light avatar at the viewing location 740 associated 735 with the location of the user.

Additionally or alternatively, the lighting network can detect a motion of the user, and redirect the light representing the light avatar based on that motion. For example, if the user changes location from the location 740 to a location 741, the executing module controls the light system to redirect light avatar in the corresponding viewing location 731.

Figure 8A:
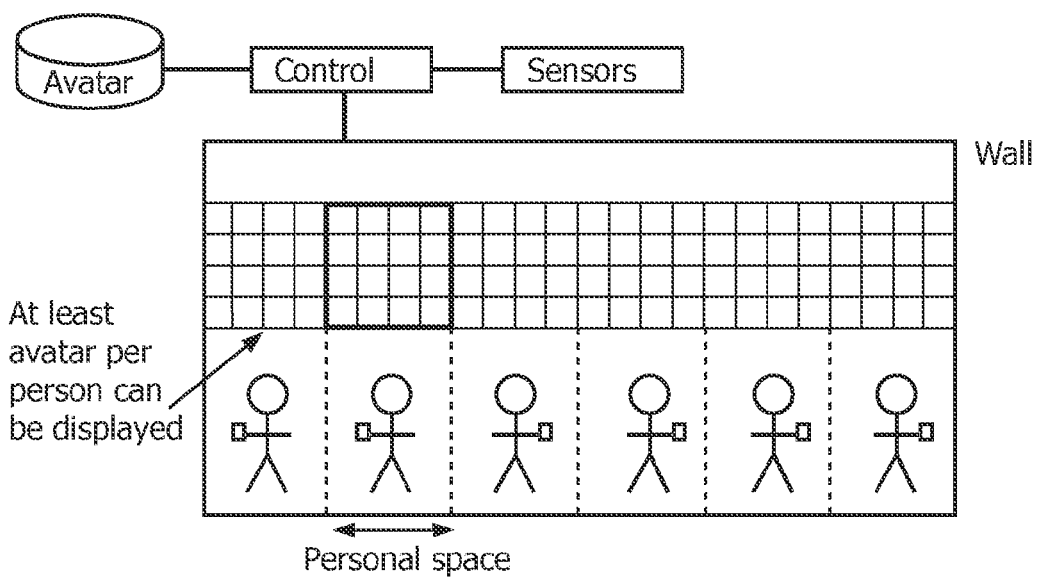
FIGS. 8A-C illustrate different embodiments for generating light avatars.

FIG. 8A shows, as a non-limiting example, a portion of an environment including a wall. Examples of the wall are a "meeting wall", an "expression wall" or an "announcement wall". For example, the wall is designed to accommodate light avatars of six users. For example, six chairs are arranged along the wall, and the wall allocates one viewing location for each chair. Each user has a light avatar stored in the memory and associated with the user by the corresponding identifier. The light avatar can be generated as, e.g., 4×4 arrays of 16 pixels.

In this example, the wall is big enough to accommodate light sources to illuminate six viewing locations. For example, the wall can include an array of light sources, each light source represent a pixel. For example, the array can include 6×16 pixels in a 4 vertical×(6×4) horizontal array, each pixel can be illuminated in a wide range of colours, e.g., the light source for each pixel can include a red, a green and a blue LED, with each LED being independently controlled. The wall can therefore be controlled to display one avatar for each user. The wall may display the light avatar next the user or next to another user, who may be socially connected or potentially interested in forming a social connection with the user.

The light avatar and the array of pixels can have different sizes and shapes. For example, in one embodiment, a size of the light avatar is 8 vertical×6 horizontal pixels. In the example when the array in the wall accommodates six users, the array has eight vertical pixels and thirty six (6×6) horizontal pixels, or eighth horizontal pixels and thirty six vertical pixels. In one embodiment, the array is not contiguous, but distributed across the environment.

Figure 8B:
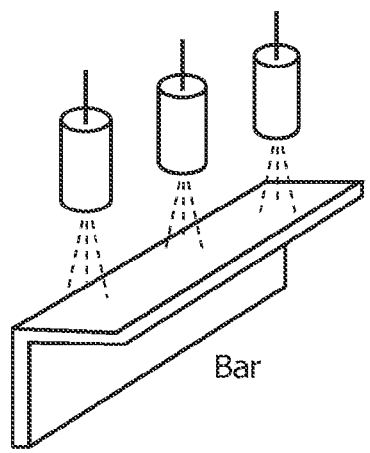

FIG. 8B shows an example of a bar for 3 people, where the light is provided from above by luminaries that project images of the light avatars onto the bar surface. As another example, a dance floor can be configured to display light avatars. The dance floor is configured to include pixels for each viewing area to display the light avatar of a user.

Figure 8C:
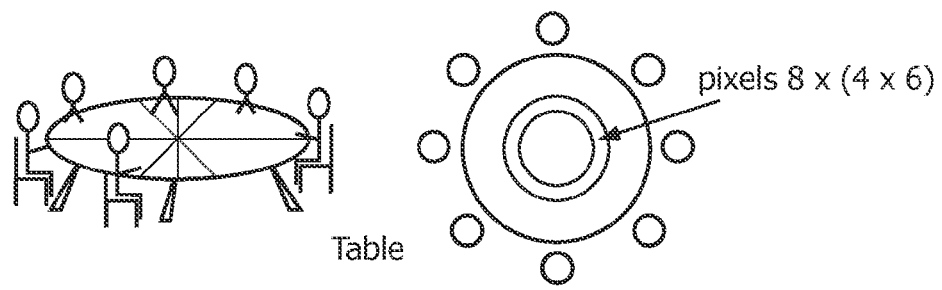

FIG. 8C shows an example of a table for 8 people. In this example, the pixels are arranged in an annulus on the surface of the table. Here, for 4×4 pixel light avatars, there are at least 8×4×4 pixels.

As another example, a waiting lounge can be configured to display light avatars, where corresponding viewing locations on the floor are illuminated. Each area can show one light avatar. In this example, there are no pixels between each viewing location.

FIG. 9 shows a block diagram of an embodiment for redirecting the portion of the light representing the light avatar based on a motion of the user. For example, the awareness module 104 is configured to track a motion 910 of the user 108 to produce data 920 indicative of the motion 910. The data 920 can represent motion as a new absolute location of the user or as an update in the last location of the user. The executive module 106 updates the control signal 107 to redirect the portion of the light representing the light avatar based on the motion 910 using the data 920 indicative of the motion.

In some embodiments, the light avatar is displayed in different portions of the environment, as the user of the light avatar moves. In a way, the light avatar "moves" in the environment concurrently with the user. In those embodiments, the light avatars are not necessarily restricted to a pre-defined viewing location. For example, the light avatar may be moved around a dance floor with the user. If a wall is enabled to display light avatars, then they can moved along the wall with the user. In one embodiment, the light avatar is displayed toward the user, and is redirected based on the motion of the user such that the light avatar appeared to be attached to the user. In various embodiments, the light avatar can be displayed and/or moved according to a layout of the lighting network.

Figure 10:
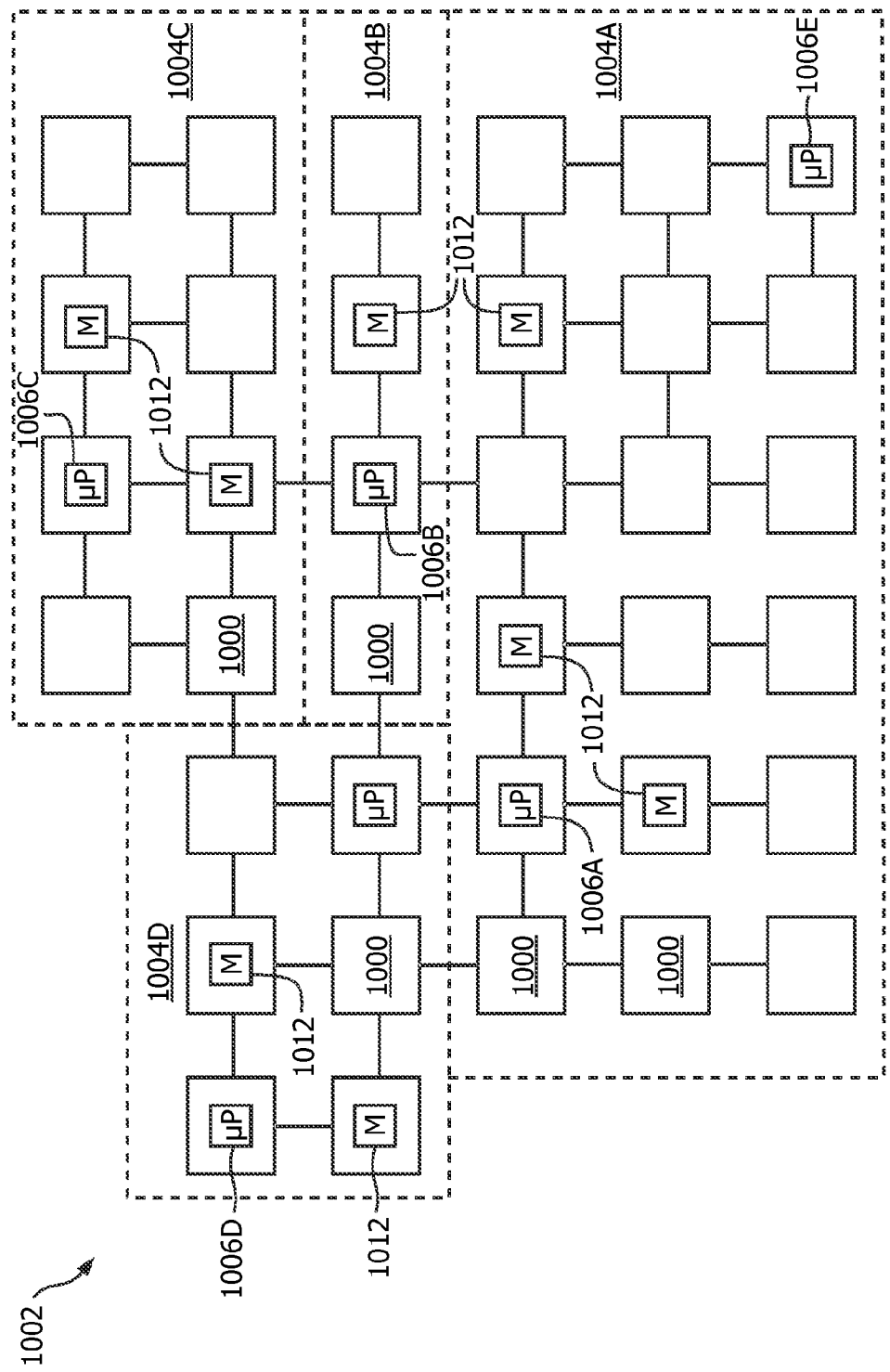
FIG. 10 illustrates a block diagram of a lighting network layout according to some embodiments of the invention.

FIG. 10 illustrates a block diagram of a network layout according to embodiments of the invention. Network 1002 includes several regions 1004A-D having a plurality of light sources 1000, which are controlled by a distributed arrangement of controllers 1006A-E which may reside in light sources 1000. For example, region 1004A may represent an office, region 1004B may represent a corridor, region 1004C may represent a waiting room, and region 1004D may represent a reception area. In one embodiment, each region 1004A-D may constitute a separate network.

The term "controller" is used herein generally to describe various apparatus relating to the operation of one or more lights. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In one network implementation, one or more devices (e.g., a light or light source in general, a lighting unit or fixture, a controller or processor associated with one or more light sources or lighting units, other non-lighting related devices, etc.) coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "addressable" is used herein to refer to a device that is configured to receive information (e.g., data) intended for multiple devices, including itself, and to selectively respond to particular information intended for it. The term "addressable" often is used in connection with a networked environment, in which multiple devices are coupled together via some communications medium or media.

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

Each of regions 1004A-D includes light sources 1000, which in one embodiment may be light sources 902A, 902B, 914A-C, 916, and 920A-D. Although region 1004A is depicted as having eighteen light sources 1000, 1004B is depicted as having four light sources 1000, 1004C is depicted as having eight light sources 1000, and 1004D is depicted as having six light sources 1000, a region may have only one light source. Light sources 1000 may communicate with each other via multiple control paths, including optical, wired, or wireless communication paths.

One or more of light sources 1000 may have a processor and/or a memory. In some embodiments, light sources 1000 having a processor such as controllers 1006A-D operate a schema for light sources 1000 in a given region. For example, controller 1006C may operate a schema for waiting room region 1004C. In one embodiment, one of the light sources having a processor may be designated as a "master" processor or controller, which monitors signals from the other processors to ensure proper system operation. The master processor may also operate a schema for a particular region 1004A-D. For example, controller 1006D may operate a schema for a region 1004D and may also act as the master processor for network 1002. If a master processor detects a problem in a processor within a light source, the master processor can designate a spare processor in the network to take over in running the schema for a region. If master controller 1006D detects a problem in a processor within a light source, e.g., controller 1006A, master controller 1006D can designate a spare processor in the network, e.g., controller 1006E to take over in running the schema for region 1004A. Memory modules 1012 may store information such as schemata and user preferences. In one embodiment, memory modules 1012 each store the same information. If a controller cannot retrieve information from one memory module, it may retrieve the same information from another memory module that it can communicate with. In another embodiment, one or more of memory modules 1012 stores differing information from the other memory modules.

In one embodiment, if one or more region 1004A-D or section of a region does not have a controller 1006, the devices in the region 1004A-D may receive instructions from and the sensors may transmit observed parameters to the processor of another region 1004A-D.

In the embodiment illustrated in FIG. 10, memory modules 1012 are distributed across the network. In this embodiment, subsystems, or regions within the network may submit data to other subsystems or regions which use the information to modify localized databases. For example, a particular set of behaviors may be established in region 1004A, and the preferences stored locally in a memory module 1012 located within region 1004A. In region 1004D, there may be no or very little established behavior, but if the sensors there detect some kind of different behavior, the controller 1006D can poll the memory modules 1012 within the network, find the closest match and copy over the data representing light avatars or schema parameters to the local database/memory within region 1004D. In one embodiment, the controller 1006D may also poll remote data stores to find the closest match and copy over the data representing light avatars or schema parameters. The principle of transferring or copying lighting behavior from one region of a network to another can also be done using a database central to the network.

In one embodiment, lighting system 102 is an existing device such as a Color Kinetics iPlayer or an illumivision Pharos. Such lighting systems rely on standard lighting network communication protocols such as Dali, DMX, Zigbee. As such, lighting system 102 may enable such protocols or other open standards to be used and therefore allow lighting network 101 to communicate using existing lighting protocols.

Figure 11A:
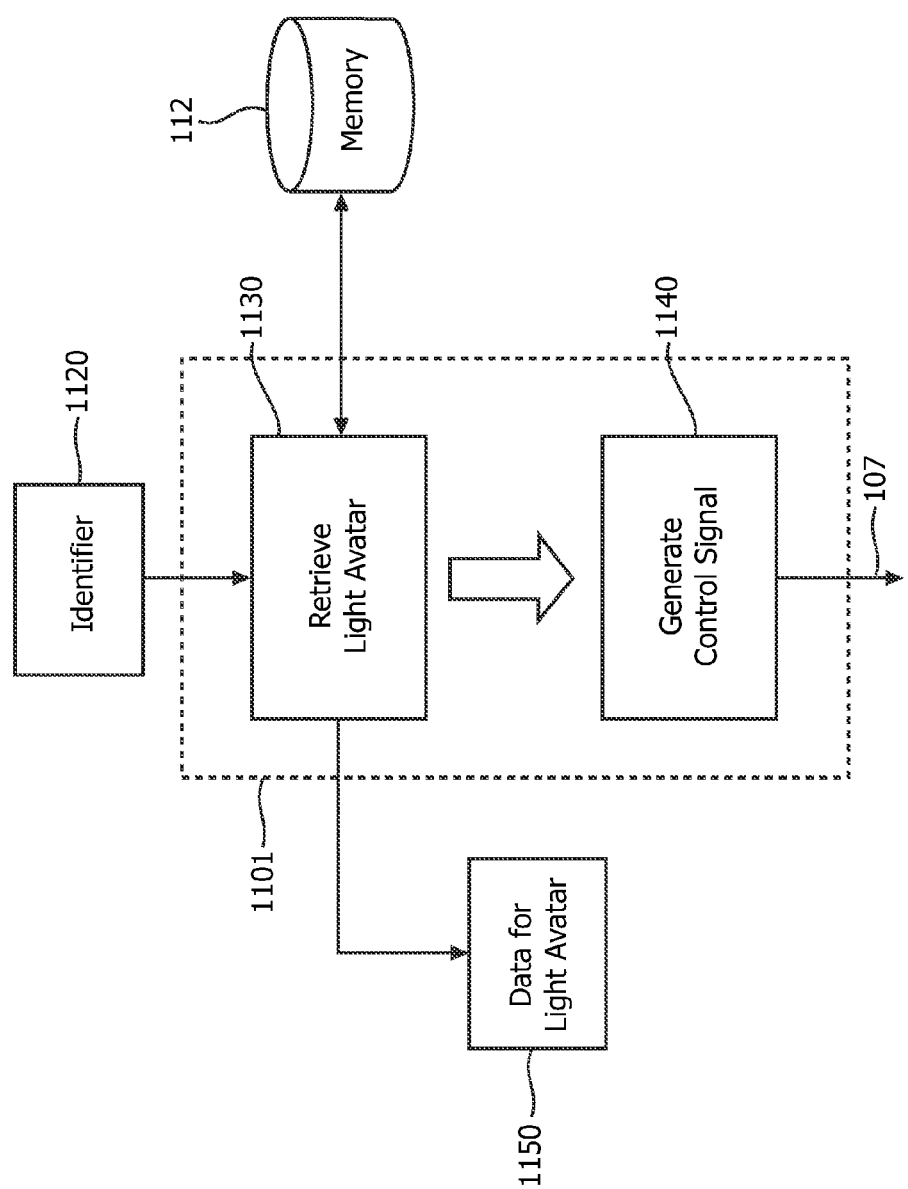
FIGS. 11A-B are flow charts illustrating generation of control signal for controlling the lighting system in accordance with some embodiments of the invention.

FIG. 11A shows a block diagram of a method illustrating an operation of the lighting network in accordance with some embodiments of the invention. The method can be implemented by a processor 1101 or equivalent thereof. The processor 1101 can be a part of the executive module or be configured to execute the executing module.

The data 1150 representing at least one light avatar stored in the memory 112 is retrieved 1130 based on the identifier 1120 for the user. Next, a control signal 107 for controlling output settings of at least one light source of the lighting system 102 is generated 1140, such that during the operation of the lighting system at least portion of the light represents the light avatar.

Figure 11B:
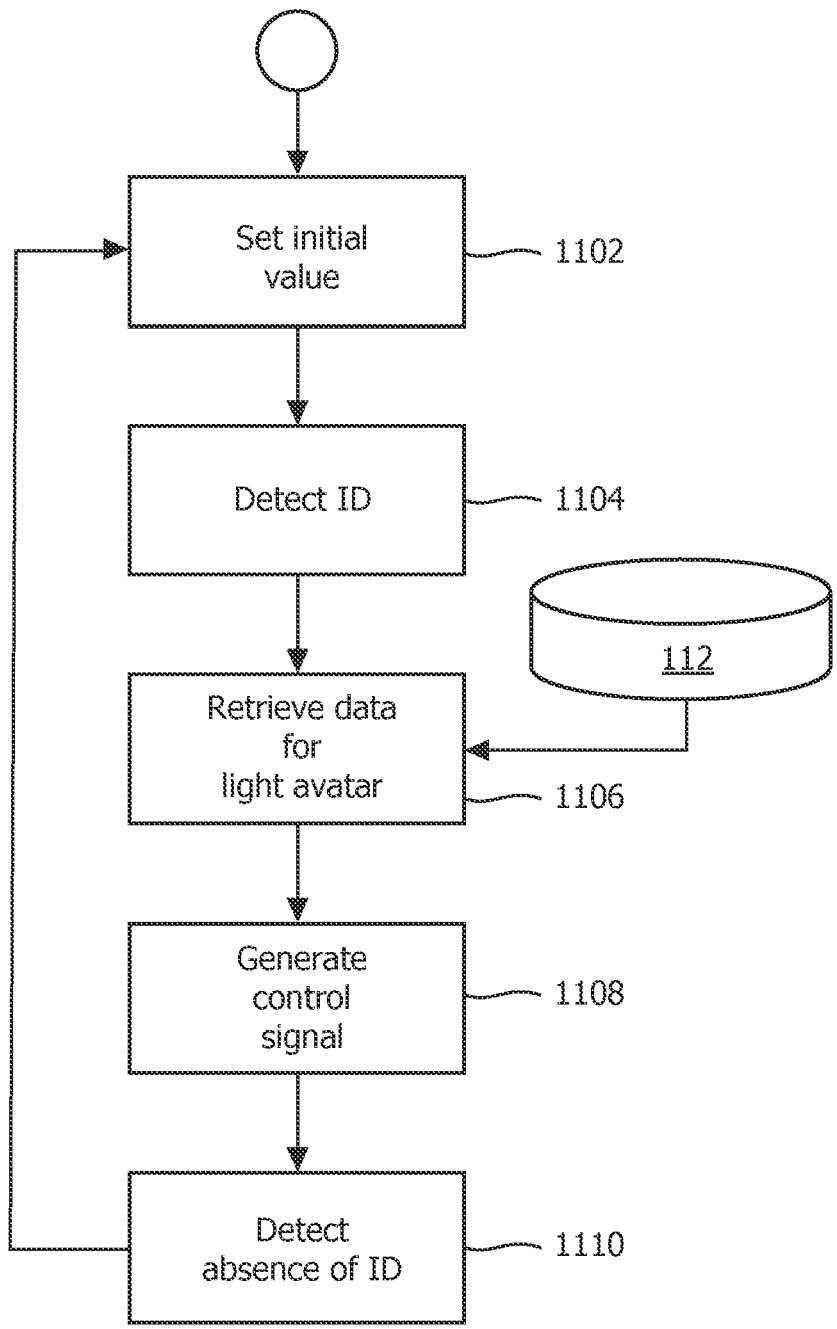

FIG. 11B shows a flow chart a method illustrating an operation of the lighting network in accordance with one embodiment of the invention. At 1102, an initial device output for a viewing location is set to a default. For example, in one embodiment, a default light avatar is displayed at the viewing location. In another embodiment, the viewing location is not illuminated. At 1104, the awareness module 102 in lighting network 101 detects the identity of user 108 in lighting network 101 such as by detecting the presence of personal identifier 110 or by detecting biometric data, and, at 1106, executive module 106 retrieves data for at least one light avatar associated with the user 108 from the memory 112. If the retrieved data indicates that a user would like to have the light avatar been displayed, at 1108, executive module 106 generates a control signal for controlling the output setting of one or more light sources in lighting system 102.

When translating data representing light avatar into control signal, executive module 106 and/or its controller may interpret the control signal in accordance with the configuration of lighting network 101. For example, the control signal can be adjusted based on a resolution, e.g., number of available pixels, of the lighting network. The control signal can also be adjusted based on an ability of the lighting network to display specific colors of the light avatar. In that situation, executive module 106 may control lighting system 102 to emit light of a similar color.

At 1110, when the awareness module 102 no longer detects the presence of the user 108 in lighting network 101, executive module 106 sets the light source output in lighting system 102 corresponding to the viewing location back to the default 1102.

According to embodiments described herein, once the light avatars of the users can be utilized in a variety of situations. For example, the light avatar of the user can convey information to other users, as described above. Also, the light avatar of the user can be used to convey the information to the user herself. For example, the lighting network can navigate the user in the environment by moving the light avatar of the user in the environment. In one embodiment, the lighting network tracks location of the users, and respond to emergency situations requiring building evacuations by calculating the optimal egress routes without the danger of crowding exits and indicate to users their corresponding routes by displaying and varying the viewing locations of the corresponding light avatars according to the egress routs.

In some embodiments, lighting system includes SSL-based luminaires capable of visible light communications. SSL-based luminaires do not need any low voltage wiring or conduits for communication cables, which may be helpful for embodiments where an IMI system is retrofitted into offices where installation of new communications wiring and conduit can be prohibitively expensive. A system utilizing SSL-based luminaires may also be inherently fault-tolerant. All luminaires within line of sight of one another are capable of communication with any other luminaire in the group. If one luminaire or its on-board processor fails for any reason, the rest of the network is unaffected. Moreover, luminaires that are not in line of sight of each other may still communicate via one or more luminaires that are within line of sight of both luminaires. Moreover, a system utilizing SSL-based luminaires can utilize visible light communications without regards to radio frequency interference or channel capacity limitations, as may occur with wireless communication techniques such as Zigbee or Bluetooth. In addition, no additional power electronics are required for SSL-based luminaires, as for example is required by some infrared LEDs or radio-frequency transceivers. The visible light modulators are an integral component of the LED drivers.

Another exemplary schema may be created for use in a hotel. For example, a hotel may implement schemata to use spotlights or wall washers to indicate that a staff member is available to serve the next guest. A network in a hotel having awareness module that can identify guests, can direct guests via displaying the light avatar of the user toward or near the staff members who are already prepared to deal with their registration. In a similar manner, an IMI system can direct a newly arrived guest to their room by tracking their RFID-equipped hotel room key and displaying periodically the light avatars of the users along the routs to their rooms.

In a similar manner, light avatars can be used to assist two or more people to locate each other in a large space. Moreover, some embodiments of the invention are based on a realization that for some people, meeting others face to face for the first time is a difficult experience. Two such people may miss out on the opportunity for a fruitful conversation because neither of them wants to be the first to break the ice. Other people may want to meet others, but may be at a loss as to the topic to use to start a conversation. Also, some people may want to meet other people with specific interests, but do not desire to speak to everybody in order to discover the people that do have the specific interests. Accordingly, there is a need for light assisted social contacts.

Figure 12:
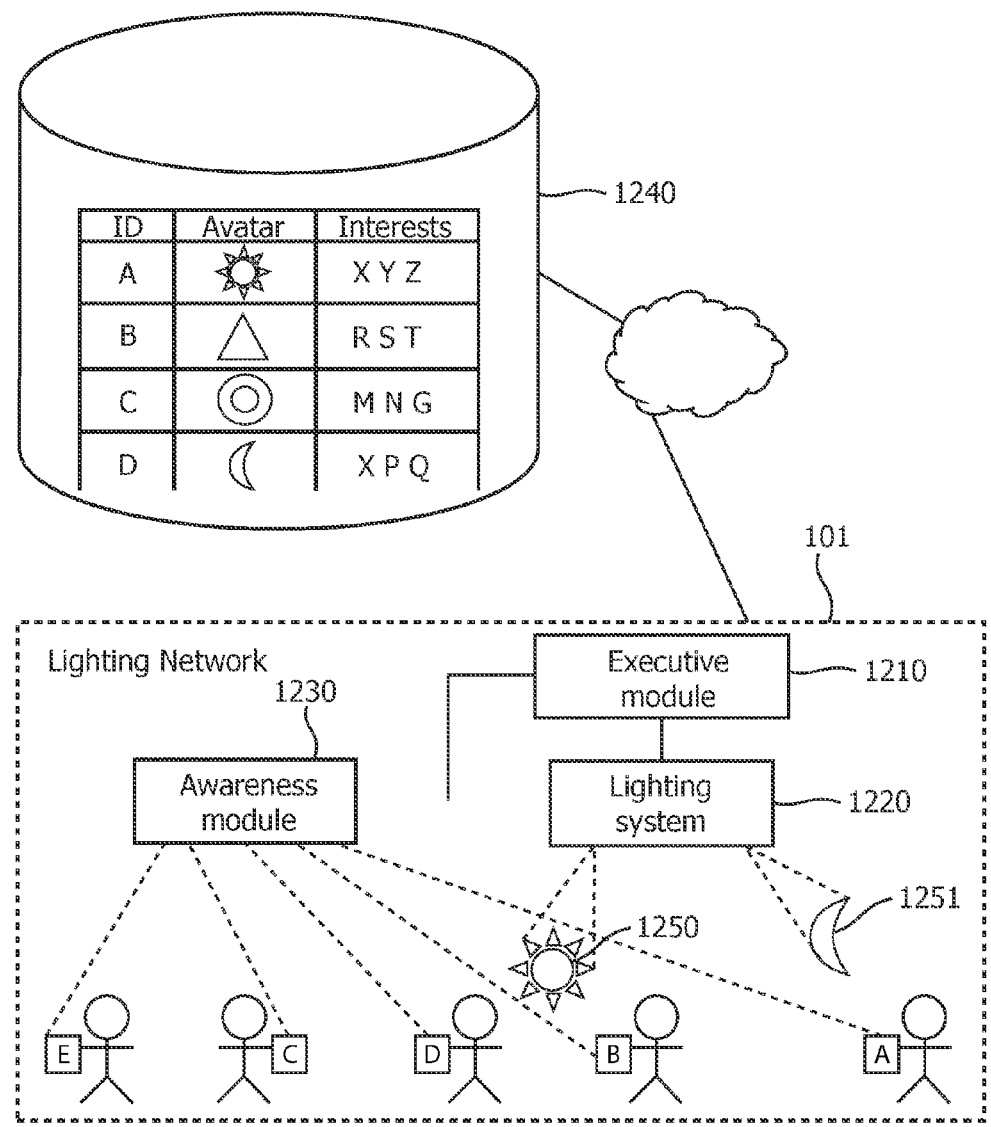
FIG. 12 is a block diagram illustrating an implementation of lighting network according one embodiment of the invention, in which interests and/or other parameters of the users are matched.

FIG. 12 shows a lighting network 101, configured to facilitate social interaction, according another embodiment of the invention. The lighting network includes lighting system 1220 for displaying light avatars of the users, an executive module 1210 for sending control signals to the lighting system and an awareness module 1230 for sensing the identities and locations of users within the space of the lighting network. The light sources of the lighting system provide illumination, luminosity or both. In various embodiments, the light sources are incorporated in the ceiling, walls, floor, furnishings, and fittings of the space. Some embodiments use video displays and/or projectors. The lights are configured with enough spatial resolution to display or project light avatars in the space.

The executive module 1210 receives from the awareness module 1230 data representing identifiers for the users located in the environment. Using this data, executive module 1210 retrieves from a memory 1240 the light avatars of users with common interests. The comparison of interests of the users can be performed by a processor of the executive module. Additionally or alternatively, the comparison can be performed by different processor, e.g., by a processor operating the memory. In the example shown in FIG. 12, users with ID's of A and D have an interest X in common. Thus, in one embodiment, the lighting network displays the light avatars 1250 and 1251 of users A and D in such a way as to signal to them that there is a match in interest. In this example, the avatar of A illuminated close to the user D, and vice versa. In one embodiment, in order to prevent that messages are received by the wrong users, the lighting network display light avatar at the viewing location closest to the intended user.

Some embodiments of the invention allow users to modify their schema to determine an avatar display mode. For example, a user may set his avatar to be ON or OFF, depending on whether the user is open for contact or not. This data can be stored in the memory, or can be transmitted by or from the personal identifier for the user. For example, the table below shows that the light avatars are generated only if both users A and B have set their preferences to "open for contact".

| ID-A | ID-B | Show avatars |
|------|------|--------------|
| ON   | ON   | Yes          |
| ON   | OFF  | No           |
| OFF  | ON   | No           |
| OFF  | OFF  | No           |

In one embodiment, as soon as a user of a light avatar engages in a conversation with another user after a match has been determined, the lighting network extinguishes the light avatars of the users engaged in the conversation and marks the users as temporarily unavailable for contact. For example, the lighting network determines the conversation based on proximity of the users to each other for a certain amount of time. Various embodiments of the invention display one or multiple matches of the user with other users. In one embodiment only one match is displayed for a given user at a time.

Figure 13:
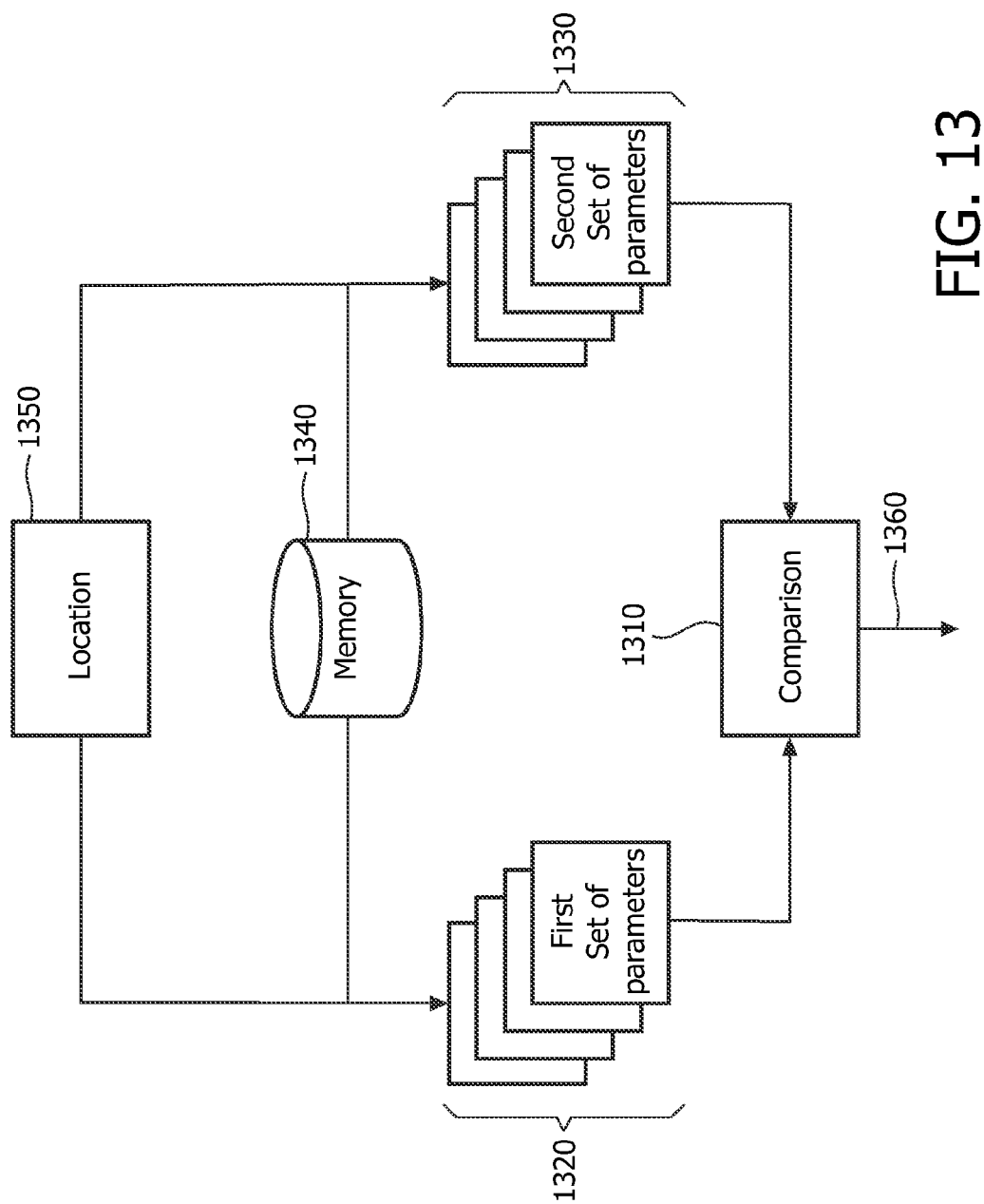
FIG. 13 is a flow chart illustrating an implementation of the lighting network shown in FIG. 12 in accordance with one embodiment of the invention.

FIG. 13 shows a block diagram of one embodiment of the invention. In this embodiment, a first set of parameters 1320 is associated with the identifier for the user. The light avatar of the user is controlled according to the first set of parameters. For example, the avatar display mode can be part of the first set of parameters. Additionally or alternatively, in one embodiment, the light avatar of the user is controlled by the control signal 1360 based on a second set of parameters 1330 associated with an identifier for another user. For example, the light avatar of the user is controlled according to a result of comparison 1310 of the first set of parameters with the second set of parameters.

The first and the second set of parameters can be retrieved from the memory 1340. However, the parameters can also be updates during the operation of the lighting system. In one embodiment, the lighting network is configured to modify the portion of the light representing the light avatar in response to a change in at least one of the first set of parameters and the second set of parameters. For example, the user can update the memory to change a parameter in the set. Additionally or alternatively, one embodiment is configured to change the output settings of the light source in response to a change in a location 1350 of the user.

For example, when user enters the environment, the lighting network compares the set of parameters of the user with parameters of other users located in the environment. The lighting network determines a match based on one or many parameters. Examples of parameters are time of entry of the user into the environment, gender and age of the user, address or nationality of the user, area of interests of the user.

In one embodiment, the memory, such as the memory 1340, is configured to record whether two different users are known to each other. For example, the two users may be friends, or they may already have made contact. In these cases, one embodiment does not display the light avatars. However, other embodiments include an option for the users of the avatars to set the avatars to display in all cases. Acquaintances, who have met on brief occasions, e.g., only once, and/or a relatively long time ago, are able to set light avatars to display in order to help the re-connection process.

Some users prefer to see who they may be engaged in a conversation with beforehand. Some embodiments allow the users to select in their preferences that they do not wish their personal space to be encroached upon by others' avatars. The users can request that others' avatars remain at a distance, in a SHOW mode.

In SHOW mode, the light avatars are displayed at a distance from the users. For example, the light avatar of first user is displayed close to the SHOWN avatar of the other user. Both users know that there is a match, and are able to look around the room to see who it may be. If first user decides to take the first step, the first user invites the light avatar of the second user to go into SNIFF mode, in which case the light avatar of the second user is displayed in proximity with the first user. In another embodiment, the first user set the light avatar into HEEL mode, in which the light avatar of the first user is displayed in the proximity to the first user. In one embodiment, the light avatar of the first user can be switched to the HEEL mode only upon acceptance by the second user. Appendix A lists exemplary set of parameters that a user can enter and modify in the memory 112 or in personal identifier 110 and which may be encoded as one or more rules in a user's schema.

Figure 14:
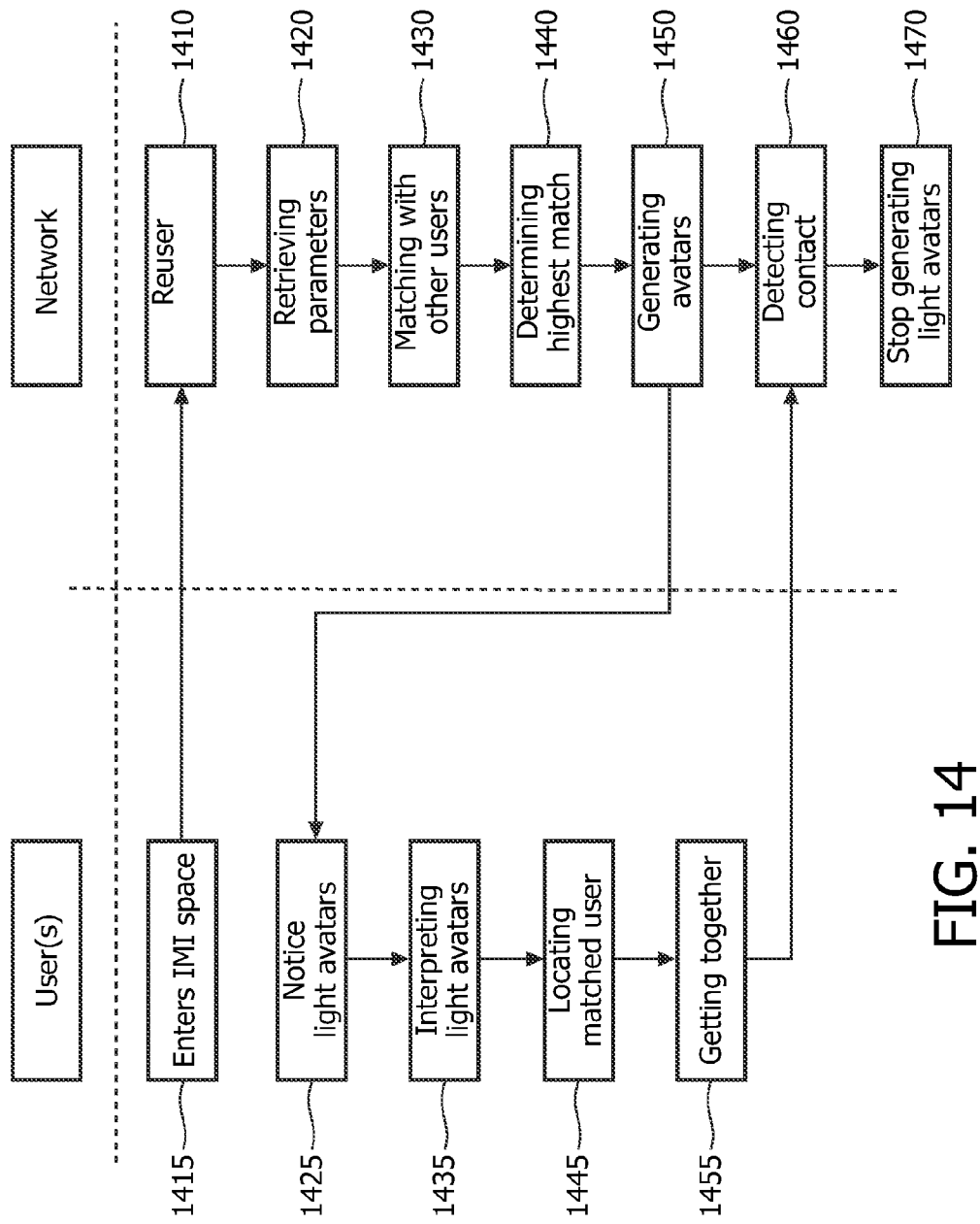
FIG. 14 is a flow chart illustrating an implementation of the lighting network shown in FIG. 12 in accordance with another embodiment of the invention.

FIG. 14 shows an activity diagram of actions perform by users and the lighting network employing the principles of the embodiments of the invention. At 1415 users enters the environment of the lighting network, e.g., enters an 'IMI enabled' bar. At 1410, the network detects that someone entering the environment and recognizes the users by determining the identifier for the user. At 1420, the network retrieves the set of parameters of the user, e.g., a first set of parameters. The network can retrieve parameters from a memory such as a remote memory and/or from a personal identifier for the user, such as mobile phone.

At 1430, the network checks whether parameters of other users in the environment are available, e.g., a second set of parameters, and whether a match between parameters of the users exists. At 1440, the network determines the 'amount of match' between all available sets of parameters and determines users having parameters with the highest match. At 1450, the network determines the location of the matched users in the environment and communicates the match to the matched users by generating their personal light avatars at the location of other matched user.

At 1425, the matched users notice the light avatars and, at 1435, interpret the light avatar as "someone wants to get in touch with me." At 1445, the matched users look around in order to find the intended conversation partner by locating their light avatar near another user. After locating the intended conversation partner, at 1455, the matched users move towards each other in the environment to get together and start a conversation. At 1460, the network detects that the matched users have made contact, e.g., by determining that locations of the matched users are close to each other, and, at 1470, the network stops generating light avatars communicating the match.

Examples below are provided for illustration purpose only and not intended to have any limiting effect on the embodiments of the invention.

Example 1

Head Hunter Looking for 'Talent'

Head hunter Ronald is flying from Amsterdam to New York. Unfortunately he didn't manage to get a direct flight and therefore he needs to make a transfer at Heathrow airport in London. Because the transfer is scheduled to be approximately 2.5 hours he decides to go for a drink at the IMI-bar at Heathrow airport. A few months ago Ronald created a personal profile for 'IMI-spaces'. He indicated in his profile that he is interested in talking to people who are interested in job opportunities, especially within the high-tech automotive industry. He also indicated in his profile that he is not interested in talking about personal and private characteristics.

As he enters the IMI-enabled bar in the airport the IMI system detects Ronald's presence. While Ronald is looking for a place to sit, the IMI system retrieves his personal profile and his preferences and compares these to the profiles of the people already present in the bar. The IMI system determines whether matches exist between Ronald's profile and the profiles of other available people. The last time Ronald visited an IMI-enabled bar he was with his girlfriend, because he didn't want to be disturbed then he switched his profile to 'not open for contact'. Currently he is interested in having a conversation; therefore he decides to set his profile to 'open for contact'.

Because it is still quite early in the morning the bar is not really crowded; therefore the IMI system only detects two small matches; the matched people are Sarah and Jeff. The match with Sarah is slightly bigger than the one with Jeff.

Sarah is a senior consultant from Chicago who happened to be in London for a short business trip. She has an IMI profile in which she indicated to be interested in job opportunities in the USA, preferably within the high-tech industry.

Because of the match between Ronald and Sarah the IMI system communicates to them that a match has been found by activating their personal 'lighting-avatars' as close to each other as possible. Because Ronald added an avatar to his personal IMI profile he immediately looks around for it to see who the matched one would be. Sarah, who did not choose a personalized avatar in her profile, notices Ronald's avatar close by and looks around for the 'default avatar' on the bar surface close to him. She interprets the avatar as indicating the one she has been matched to. See notices Ronald and concludes that he must the one she has been matched to.

Ronald and Sarah approach each other and get acquainted; they decided to take a seat and they start talking. The IMI system notices that Ronald and Sarah are not present on their previous locations; therefore the avatars are switched off.

Example 2

Someone Looking for Conversation Partner on Industry Level

Senior mechanical engineer Robert has been staying in Eindhoven for business for the past few days. Tonight no meetings were scheduled and therefore he decides to go to the hotel bar. During the check-in in the hotel Robert was told that the hotel had an IMI-enabled bar. The hotel employee explained that he would need a profile in order to make use of the system and he was also told how he should create this profile. Robert decides to take some time to create a personal profile before going to the bar. Since mechanical engineering is his core competence he decided to only add this topic in his profile. Because he is not interested in job opportunities he decides not to add that to the profile. After he finished creating the profile it is stored in the IMI database. Robert decides to go to the hotel bar and right before he leaves he decides to set his profile to 'open for contact'.

Right before entering the hotel bar the IMI system detects Robert's presence and retrieves his profile from the database. While Robert enters the bar the system compares Robert's profile to the profiles of the people that are already inside the bar. The IMI system detects a match with a conversation that is already going on in the bar. Johan and Bart are also mechanical engineers. Approximately half an hour ago the IMI system also linked them to each other. As Robert enters the bar his avatar is activated right beside the location of Johan and Bart.

Robert notices his personal avatar and walks up to the table Johan's sitting at. He asks whether he can join them for a drink and a talk. Johan and Bart do not mind and accept the invitation. Robert joins them and is involved in the conversation.

The IMI system detects that Johan is involved in a conversation and therefore switches off his personal avatar.

Example 3

Conversation on Personal Level

Rick is visiting Amsterdam for a short business trip. He will fly back home early next morning because no more meetings were scheduled. Because he still needs to spend an extra night he decides to visit an IMI bar. He has been in Amsterdam quite often and during his previous stays he visited the IMI bar quite often. At home in Boston, he also visits the IMI bar quite often. He likes to go there in order to get in touch with people with similar preferences. He keeps his profile up-to-date and changes it quite often. He recently added some extra 'personal' items to his profile, for instance he indicated that he likes to listen to rock music, he likes to go mountain biking and he likes cooking; especially Italian food.

As he enters the IMI-enabled bar in Amsterdam he is recognized by the IMI system. While he takes a seat at the bar the system retrieves his profile and compares it to the profiles of the people already present in the bar.

The IMI system detects a huge match with Harry; a guy from Amsterdam who is into mountain biking and rock music as well. Besides that, Harry is working in the same industry as Rick. Because of the match, the IMI system activates both Rick's and Harry's avatar close to each other's current locations. The match size causes the sizes of the avatars to be very big and besides that they are pulsating as well.

Rick notices that his avatar is activated on the surface of the bar Harry is sitting at. His avatar is pulsating back towards his location on the bar. Harry's avatar is also activated on the bar surface close to Rick; it is pulsating back towards Harry.

Since their locations are not that far apart they notice each other's avatars and decide to walk up to each other. They get acquainted and take a seat at a table, away from the bar. The IMI system notices that Harry and Rick have made contact and fades out their avatars on the bar.

Some embodiments, in order to prevent matches not being noticed by the matched users, performs one or combination of the following. The network keeps track of the location of the users and if the location of the users changes the viewing locations of the light avatars are also changed dependently. In one embodiment, when the network detects that there is no response from the user to the initial message represented by the light avatar, the light avatar is generated to other locations close to the user. Also, sizes of the light avatars can be varied, and/or the intensity of the light avatars can be increased.

In some embodiments, when network detects that there is no response from the matched users upon generation of the light avatars the network fades out the light avatars. In one embodiment, the network does not match those users again as long as they are in this specific environment.

In some embodiments, the environment, e.g., the IMI-enabled facility, is big and users do not necessarily have direct "line-of-sight." In those embodiments, the network enable "zone-matching," i.e., matches users based on location within the IMI-enabled facility, i.e. a user in the front area of the facility is not matched to someone in the back even though their is a match between their profiles.

In some embodiments, users set their preferences to be open to simultaneous matching with more than one other user. For example, users set their 'group' preference to three. Provided there were three users that could be matched with a common theme, and all had specified a 'group' preference of three or more, then all those users are matched.

In some embodiments, users can set "open for contact" parameter, and specify a delay for the network to initiate the match after users enter the environment. The users also have an option to modify this parameter. In one embodiment, when two users who have met then separate, a new match is attempted after a short time period. However, users can modify their parameters as "not open for contact."

If some user wants to escape after making contact, then, according one embodiment, after a predetermined time after contact is made, an automated phone call is made to the user's mobile phone. Also, in one embodiment, the matching occurs in a designated zone within environment, which allows users to leave that designating zone to avoid matching.

As discussed above, a light avatar is a luminous symbol that represents a person and is an additional way for people to personalize their surroundings. Some people will be happy to design their own light avatars, whereas others would prefer to choose ones that already exists. People may like to change their avatars from time to time, and may not want to design a new one each time. A light avatar has certain similarities with clothing accessories, in that certain people may want to have designer-avatars. Such avatar designers may want to be remunerated for use of their artwork. Clubs may want to sell their avatars to their members. People may want to be remunerated by carrying an avatar of an advertiser. Creators of avatars may want to be sure that no-one will copy their work. Some embodiments of the invention address abovementioned needs via marketplace of light avatars.

Figure 15:
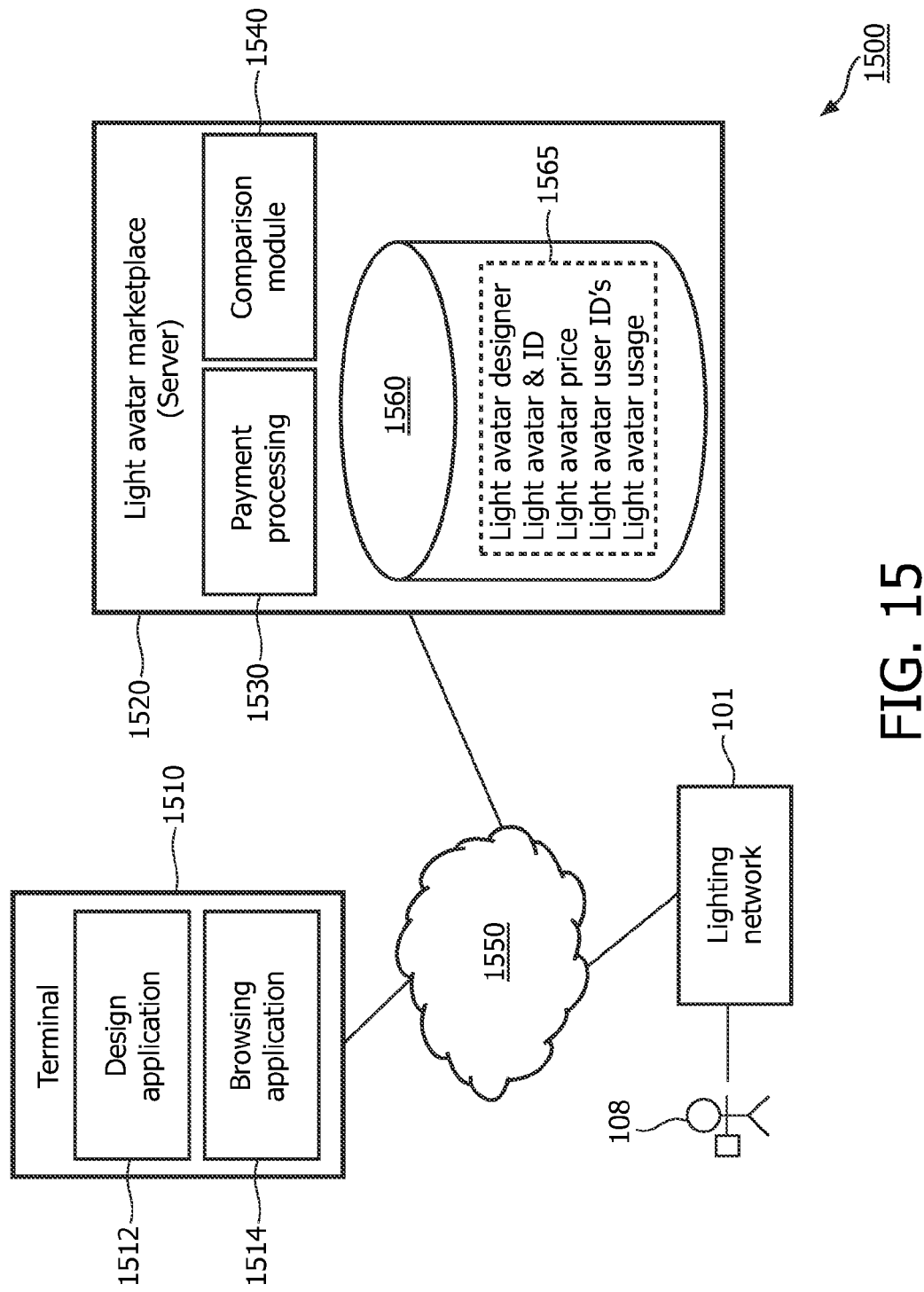
FIG. 15 is a block diagram of light avatar marketplace according one embodiment of the invention.

FIG. 15 shows a block diagram of a system 1500 for creating, storing, managing and distributing light avatars. The system 1500 may include a terminal 1510 for designing light avatars using a design application 1512 and/or for browsing existing light avatars using a browsing application 1514.

The design application 1512 and the browsing application 1514 may be implemented as a server-side process executed on a server computer, a personal computer, a series of server computers, a mini computer, a mainframe computer or as a client-side process executed on a client electronic device, e.g., a desktop computer, laptop computer, a notebook computer, and/or on a personal digital assistant such as a PDA or a smart phone. Additionally, the design application 1512 and the browsing application 1514 may incorporate all or part of third party software, such as website icon designer tool or similar applications.

The system 1500 may also include a database 1560 including data 1565 associated with light avatars. The data 1565 includes but not limited to one or combination of data representing light avatars themselves, e.g., instructions to the lighting system for generation light avatars, or data representing colours and/or intensities of the pixels of the light avatars, identifier for the light avatars, names or identifiers of the designers of each avatar, prices and terms of usage of the light avatars.

For example, the designer of a light avatar may also be a user of the light avatar and/or the designer can make the light avatar available for others to use. Similarly, a user may be associated with one or multiple light avatars. For example, some or all of the light avatars can be designed by the user, and some or all light avatars of the user can be design by another designer. In various embodiments, users are allowed to use different light avatars for different situations or occasions, or just to switch among different light avatars from time to time. For example, one embodiment associate user identifier with a light avatar and with a type of venue in which this light avatar is used. Another embodiment, selects the light avatars of the user according a schema and/or at random, e.g., similar to a "shuffle" function of an iPod.

In one embodiment, the database 1560 also stored popularity index for at least some light avatars. For example, each time when the lighting network 101 accesses or displays a light avatar, the usage of the light avatar can be recorded in the database 1560. When people are browsing to find a new light avatar, the popularity index of browsed light avatar can be displayed on the terminal. The popularity index can also reflect a number of users using the light avatar, the number of times the light avatar has been displayed, the total cumulative duration for which the light avatar has been displayed, or other similar parameters.

The database 1560 can be implemented on a system 1520, which can include a processor and a memory for storing and running the database 1560. The system 1520 can be referred herein as light avatar marketplace. For example, the system 1520 may be implemented as a server-side process or as a client-side process. Additionally or alternatively, any combination of one or more computer-readable medium(s) may be utilized. The computer-readable medium may be a computer readable signal medium or a computer readable storage medium. A computer-readable storage medium may be, for example, but not limited to, an electronic, magnetic, optical, electromagnetic, infrared, or semiconductor system, apparatus, a device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer-readable storage medium may be any medium that can contain, or store a program for use by or in connection with an instruction execution system, apparatus, or device. A computer readable signal medium may include a propagated data signal with computer-usable program code embodied therein, for example, in baseband or as part of a carrier wave. Such a propagated signal may take any of a variety of forms, including, but not limited to, electro-magnetic, optical, or any suitable combination thereof, A computer readable signal medium may be any computer-readable medium that can contain, store, communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc. Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages.

The terminal 1510 and the system 1520 can be implemented one the same computer, different and/or remote computers or distributed among a number of computers. The computers may be connected to each other through a local area network (LAN) or a wide area network (WAN), or the connection may be made to an external computer (for example, through the Internet using an Internet Service Provider). Additionally or alternatively, the terminal 1510 and the database 1560 can connected through a network 1550. The connection can be wired or wireless, e.g., Internet and/or through wireless access point (i.e., WAP). The WAP may be, for example, an IEEE 802.11a, 802.11b, 802.11g, Wi-Fi, and/or Bluetooth device that is capable of establishing wireless communication channel remote computers.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The terminal 1510 and/or the system 1520 may each execute an operating system, examples of which may include but are not limited to Microsoft Windows®, Microsoft Windows CE®, Red Hat®, Linux®, or a custom operating system (Windows is a registered trademarks of Microsoft Corporation in the United States, other countries or both; Redhat is a registered trademark of Red Hat Corporation in the United States, other countries or both; and Linux is a registered trademark of Linus Torvalds in the United States, other countries or both).

Similarly, the terminal 1510 and/or the system 1520 may be connected to the lighting network 101 for generating light representing the light avatars of the users, as described above.

The light avatars can be made available for users free of charge, or for compensation. The light avatars can be made available in restricted numbers. Additionally or alternatively, designers and/or owners of the light avatars, e.g., advertisers, may offer to pay users to use the light avatars. Payment may be made as a one-off payment or in proportion to usage of the light avatar, e.g., number and/or length of times the light avatar is displayed, a number and/or types of different venues the light avatar is displayed in, duration of time the light avatar is associated with a user. Also, a designer of popular light avatars may be remunerated via ad revenue, where the ads are posted concurrently with displaying the light avatars.

Accordingly, some embodiments include a payment processing module 1530 for facilitating payments among different users of the light avatar marketplace. The payment processing module 1530 can be implemented on the system 1520 and/or as a third party payment processing site.

Also, the system 1520 may include a comparison module 1540 for comparing light avatars. For example, in one embodiment the comparison module 1540 compares existing light avatars to find similar ones to present to a user for a selection. In another embodiment, the comparison module 1540 is used to compare new light avatars with existing light avatars, to prevent new light avatars being registered if the new light avatars are similar to the existing light avatars.

For example, various implementations of the comparison module 1540 compare light avatars to each other using, e.g., a MacAdam ellipse method, colour difference metric, e.g., The International Commission on Illumination (CIE) distance metric and other comparison methods known in the art.

In some embodiments, the comparison module 1540 rejects the light avatars based on the result of comparison and a restriction associated with similar avatars. For example, the light avatar may have no restriction, and the comparison module allows adding new light avatar into the database even if the new avatar is similar or identical to the existing light avatar. For example, the new light avatar can be accepted if the new light avatar has less then 90% of pixels identical to the existing light avatar within a MacAdam ellipse. On another hand, the existing light avatar may be highly restricted, e.g., a registered trade mark, and the new light avatar is rejected even if the similarity between the new and existing light avatars is not apparent. For example, the new light avatar can be accepted if the new light avatar has less then 50% of pixels identical to the existing light avatar within a MacAdam ellipse. As will be appreciated by one skilled in the art, different comparison techniques and/or thresholds can be used.

Also, in one embodiment, the comparison module uses different restriction for different users' actions. For example, the comparison module can be used to search the database for similar light avatars with or without restrictions, but can prevent updating the light avatars into the database based on the restrictions. Also, in one embodiment the comparison module compares the light avatar with a certain minimum complexity threshold, to avoid the designer of a light avatar with a simple geometric shape preventing other people from using the same shape. For example, if a digital file of a light avatar is compressed, then the resulting size of the compressed file would need to above a certain value.

In its most general sense, the lighting network disclosed herein can be combined with any IMI environment to perform IMI-related functions. The components of the network can be shared or reused by other IMI systems and the network does not need to be fixed. For example, computers hosting sensors in the awareness module, e.g., ambient light and occupancy sensors, may not even be aware that they are being used for IMI purposes. If they are, the computers can influence its operation without the IMI system being programmed to monitor and control them. From IMI's perspective, the computers are simply data sources.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

APPENDIX A

Exemplary Set of Parameters

| ID-A Status | ID-A A's avatar | ID-A Request to other users' avatars | ID-B B's avatar | |
|---|---|---|---|---|
| closed for contact | OFF | Distant | N/A | User A may want to display his avatar for other reasons |
| | ON - HEEL | Distant | N/A | |
| | ON - SHOW | Distant | N/A | |
| open for contact | ON - SHOW (ready to SNIFF if invited) | Distant (SHOW) | SHOW | Both users want to see that there's a match, and potentially make sure that there are no 'horrors' in the room. |
| | ON - SNIFF (automatically changing from SHOW mode) | Distant (SHOW) | HEEL | User B is making himself known, inviting user A to make contact |
| | ON - SHOW, then HEEL | Invitation to SNIFF | SNIFF | User A is making himself known, inviting user B to make contact |
| | ON - SHOW (ready to SNIFF if invited) | Request to go to owner's HEEL | HEEL, if accepts | User A requests user B to make himself known. |
| | ON - SNIFF | Near (SNIFF) | SNIFF | Each avatar displayed close to the other matching user. Both users want to be approached |

The invention claimed is:

1. A lighting network for facilitating operation of a lighting system comprising at least one light source and configured to generate light forming light avatars associated with a plurality of users, the network comprising:
   a memory for storing identifiers respectively uniquely associated with the plurality of users, wherein the memory stores sets of parameters uniquely describing respectively said plurality of users and stores data characteristically representing the light avatars for the plurality of users;

an executive module configured to, in response to detection of identifiers of first and second users of said plurality of users, retrieve from the memory respective first and second sets of parameters of said sets of parameters that are respectively associated with said first and second users based on the identifiers of the first and second users, and data characteristically representing at least one light avatar uniquely associated with the first user, and to generate, based on the retrieved data, a control signal for controlling output settings of the at least one light source to generate the at least one light avatar, wherein the executive module is configured to generate the control signal based on a comparison between the first set and the second set of parameters; and at least one processor configured to execute the executive module, such that, during the operation of the lighting system, at least a portion of the light generated by the at least one light source forms the at least one light avatar based on the control signal.

2. The lighting network of claim 1, further comprising an awareness module for supplying the identifiers of the first and second users to the executive module.

3. The lighting network of claim 2, wherein the awareness module includes a sensor unit for detecting the identifiers of the first and second users.

4. The lighting network of claim 2, wherein the awareness module includes a location unit for determining a location of the first user in an environment, and wherein the executive module controls the light source to generate the at least one light avatar into a viewing location associated with the location of the first user.

5. The lighting network of claim 1, wherein the executive module controls the at least one light source to generate the at least one light avatar.

6. A lighting network for generating light forming light avatars of a plurality of users, comprising:

an awareness module for detecting an identifier for each of the plurality of users;

at least one light source having controllable output settings; and an executive module in communication with the awareness module, with the at least one light source and with a memory for storing identifiers respectively uniquely associated with the plurality of users, wherein the memory stores sets of parameters uniquely describing respectively said plurality of users and stores data characteristically representing the light avatars for the plurality of users, wherein the executive module, in response to detection of identifiers of first and second users of said plurality of users, receives the identifiers of the first and second users from the awareness module, retrieves from the memory respective first and second sets of parameters of said sets of parameters that are respectively associated with said first and second users based on the identifiers of the first and second users, and the data characteristically representing at least one light avatar uniquely associated with the first user based on the identifier for the first user, and generates a control signal for controlling the output settings of the at least one light source to generate the at least one light avatar according to the retrieved data, and wherein the executive module is configured to generate the control signal based on a comparison between the first set of parameters and the second set of parameters; and at least one processor configured to execute the executive module, such that, during operation of the lighting system, at least a portion of the light generated by the at least one light source forms the at least one light avatar based on the control signal.

7. The lighting network of claim 6, wherein the awareness module determines a location of the first user, and wherein the executive module controls the light source to direct the portion of the light forming the at least one light avatar toward the location of the first user.

8. The lighting network of claim 7, wherein the awareness module is configured to track a motion of the first user, and wherein the executive module is configured to redirect the portion of the light forming the at least one light avatar based on the motion.

9. The lighting network of claim 6, wherein the at least one light source is configured to generate the light into an environment partitioned into a set viewing locations associated with a set of locations of the plurality of users, wherein the awareness module determines a location of the first user in the environment, and wherein the executive module controls the light source to generate the at least one light avatar at the viewing location associated with the location of the first user.

10. The lighting network of claim 6, wherein the control signal is suitable to individually control pixels generated by the lighting source.

11. The lighting network of claim 6, wherein the memory associates the first set of parameters with the identifier for the first user, and wherein the executive module controls the at least one light avatar of the first user according to the first set of parameters.

12. The lighting network of claim 11, wherein the memory associates the second set of parameters with the identifier of the second user.

13. The lighting network of claim 12, wherein the executive module is configured to modify the portion of the light forming the at least one light avatar in response to a change in at least one of the first set of parameters and the second set of parameters.

14. The lighting network of claim 6, wherein the executive module is configured to change the output settings of the light source in response to a change in a location of the first user.

15. The lighting network of claim 1, wherein the at least one light avatar is at least one first light avatar, and wherein the execution module is configured to control said at least one light source such that said at least one first light avatar is formed closer to said second user than said first user and such that at least one second light avatar associated in said memory with said second user is formed closer to said first user than said second user.

16. The lighting network of claim 15, wherein the execution module is configured to implement the formation of the at least one first light avatar and the at least one second light avatar in response to determining that said first set of parameters matches said second set of parameters.

17. The lighting network of claim 6, wherein the at least one light avatar is at least one first light avatar, and wherein the execution module is configured to control said at least one light source such that said at least one first light avatar is formed closer to said second user than said first user and such that at least one second light avatar associated in said memory with said second user is formed closer to said first user than said second user.

18. The lighting network of claim 17, wherein the execution module is configured to implement the formation of the at least one first light avatar and the at least one second light avatar in response to determining that said first set of parameters matches said second set of parameters.

* * * * *